United States Patent
Yokota

(10) Patent No.: US 8,558,957 B2
(45) Date of Patent: Oct. 15, 2013

(54) LIGHTING DEVICE, DISPLAY DEVICE AND TELEVISION RECEIVER

(75) Inventor: Masashi Yokota, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 68 days.

(21) Appl. No.: 13/378,708

(22) PCT Filed: May 17, 2010

(86) PCT No.: PCT/JP2010/058285
§ 371 (c)(1),
(2), (4) Date: Dec. 16, 2011

(87) PCT Pub. No.: WO2011/001750
PCT Pub. Date: Jan. 6, 2011

(65) Prior Publication Data
US 2012/0086874 A1  Apr. 12, 2012

(30) Foreign Application Priority Data

Jun. 30, 2009  (JP) ................................. 2009-155493

(51) Int. Cl.
| | |
|---|---|
| *H04N 3/14* | (2006.01) |
| *H04N 3/12* | (2006.01) |
| *H04N 5/44* | (2011.01) |
| *G02F 1/1335* | (2006.01) |
| *G09F 13/04* | (2006.01) |

(52) U.S. Cl.
USPC ............. 348/790; 348/798; 348/725; 349/62; 362/97.1; 362/97.3

(58) Field of Classification Search
None
See application file for complete search history.

(56) References Cited

U.S. PATENT DOCUMENTS

| | | | |
|---|---|---|---|
| 2006/0215386 A1* | 9/2006 | Hatanaka et al. | 362/29 |
| 2007/0086181 A1* | 4/2007 | Hatanaka et al. | 362/97 |
| 2010/0231806 A1* | 9/2010 | Kuromizu | 348/725 |
| 2010/0328555 A1* | 12/2010 | Kuromizu | 348/790 |
| 2011/0007231 A1* | 1/2011 | Takata | 348/798 |
| 2011/0032452 A1* | 2/2011 | Takata | 349/62 |

FOREIGN PATENT DOCUMENTS

| | | |
|---|---|---|
| JP | 09-236803 A | 9/1997 |
| JP | 2005-117023 A | 4/2005 |

OTHER PUBLICATIONS

Official Communication issued in International Patent Application No. PCT/JP2010/058285, mailed on Jul. 13, 2010.
Yokota, "Lighting Device, Display Device and Television Receiver", U.S. Appl. No. 13/378,710, filed Dec. 16, 2011.
Yokota, "Lighting Device, Display Device and Television Receiver", U.S. Appl. No. 13/378,712, filed Dec. 16, 2011.

* cited by examiner

*Primary Examiner* — Jefferey Harold
*Assistant Examiner* — Sean Haiem
(74) *Attorney, Agent, or Firm* — Keating & Bennett, LLP

(57) ABSTRACT

It is an object of the present invention to provide a lighting device realizing improvement in brightness of an intended area such as a center area of an irradiation surface. A lighting device 12 of the present invention includes a light source 17, a chassis 14 housing the light source 17, and an optical member 15a facing the light source 17. The optical member 15a has a light source overlapping portion DA overlapping with a light source arrangement area LA where the light source 17 is arranged, on the chassis 14, and a light source non-overlapping portion DN overlapping with a light source non-arrangement area LN where the light source 17 is not arranged. The light source overlapping portion DA has a surface facing the light source 17, the surface having a light reflectance greater than that of the light source non-overlapping portion DN. The light source overlapping portion DA includes a low light reflectance area LR having a surface facing the light source 17, the surface having a light reflectance smaller than that of a surrounding area in the light source overlapping portion DA.

15 Claims, 22 Drawing Sheets

LIGHTING DEVICE, DISPLAY DEVICE AND TELEVISION RECEIVER

TECHNICAL FIELD

The present invention relates to a lighting device, a display device and a television receiver.

BACKGROUND ART

For example, a liquid crystal panel used for a liquid crystal display device such as a liquid crystal television does not emit light, and thus a backlight unit is required as a separate lighting device. The backlight unit is known, which is placed behind the liquid crystal panel (on a side opposite to a display surface side). The backlight unit includes a chassis having an opening on a liquid crystal panel side surface, numerous light sources (for example, cold cathode tube) housed in the chassis as lamps, and an optical member (diffuser and the like) provided in the opening of the chassis and efficiently discharging light emitted from the light sources to the liquid crystal panel side.

When the light sources emit linear light in the backlight unit, the linear light is converted into planar light by the optical member to uniform brightness of illumination light. However, when the line light is not sufficiently converted into the planar lights, a linear lamp image is generated along arrangement of the light sources, which deteriorates display quality of the liquid crystal display device.

In order to achieve uniform illumination light in the backlight unit, for example, it is desirable that the number of the light sources to be arranged is increased to reduce a distance between the light sources that are adjacent to each other or a diffusivity of the diffuser is increased. However, when the number of the light sources is increased, cost of the backlight unit is increased, and power consumption is also increased. When the diffusivity of the diffuser is increased, brightness cannot be increased, which disadvantageously requires an increase in the number of the light sources at the same time. Then, a known backlight unit suppressing power consumption and maintaining uniform brightness is disclosed in the following Patent Document 1.

The backlight unit described in Patent Document 1 includes a diffuser provided in a floodlight direction of a plurality of light sources. A pattern of dots for modulated light is printed on the diffuser. The pattern has total light transmittance (opening ratio) of 62 to 71% and a haze value of 90 to 99%. Particularly, a diameter of a dot located immediately above each light source is great. The diameter of the dot is reduced as departing from each light source. According to such a configuration, light emitted from the light sources is efficiently utilized, and thereby light having sufficient and uniform brightness can be irradiated without increasing power consumption of each light source.

Patent Document 1: Japanese Unexamined Patent Publication No. 2005-117023

Problem to be Solved by the Invention

Because the dot located immediately above the light source and having a large diameter is formed in the device disclosed in Patent Document 1, the light from the light source is reflected by the dot, which tends to reduce brightness immediately above the light source. In this context, for example, when the light source is put on the center area of the backlight unit, brightness in a center area of an irradiation surface may be reduced. When the backlight unit is used for the display device, human eyes usually pay attention to a center area of a display screen. Therefore, when brightness in the center area is low, a low-brightness region tends to be conspicuous, which may remarkably reduce visibility.

DISCLOSURE OF THE PRESENT INVENTION

The present invention was accomplished in view of the above circumstances. It is an object of the present invention to provide a lighting device realizing improvement in brightness of an intended area such as a center area of an irradiation surface. It is another object of the present invention to provide a display device including the lighting device. It is still another object of the present invention to provide a television receiver including the display device.

Means for Solving the Problem

To solve the above problem, a lighting device of the present invention includes a light source, a chassis housing the light source and having an opening through which light exits, and an optical member facing the light source and provided to cover the opening. The chassis includes a light source arrangement area where the light source is arranged and a light source non-arrangement area where no light source is arranged. The optical member has a light source overlapping portion overlapping with the light source arrangement area and a light source non-overlapping portion overlapping with the light source non-arrangement area. The light source overlapping portion has a surface facing the light source, the surface having a light reflectance greater than that of the light source non-overlapping portion. The light source overlapping portion has a surface facing the light source, the surface having a low light reflectance area. The low light reflectance area has a light reflectance smaller than that of a surrounding area in the light source overlapping portion.

Because light emitted from the light source arranged in the light source arrangement area first reaches the light source overlapping portion having a greater light reflectance in the optical member according to such a configuration, the light is mostly reflected (that is, not transmitted), to suppress brightness of illumination light to an emission amount of the light from the light source. The light is reflected within the chassis, and can reach the light source non-arrangement area. Because the light source non-overlapping portion overlapping with the light source non-arrangement area in the optical member has a smaller light reflectance, more light is transmitted, and thereby brightness of predetermined illumination light can be obtained. Therefore, because an almost uniform brightness distribution can be entirely obtained without evenly arranging the light sources on the chassis, the configuration can contribute to cost reduction. In the light source overlapping portion having a greater light reflectance, light is mostly reflected, which tends to reduce brightness. For example, it is difficult to intentionally enhance brightness in a predetermined place such as the center area of the irradiation surface and the like. In the present invention, the light source overlapping portion of the optical member has a low light reflectance area having a light reflectance smaller than that of the surrounding area in the light source overlapping portion of the optical member. Because the light from the light source is hardly reflected in the low light reflectance area, the improvement in brightness of the intended area can be realized by arranging the low light reflectance area in the predetermined area.

BEST MODE FOR CARRYING OUT THE INVENTION

First Embodiment

A first embodiment of the present invention will be described with reference to FIGS. 1 to 10.

First, a configuration of a television receiver TV including a liquid crystal display device 10 will be described.

Figure 1:
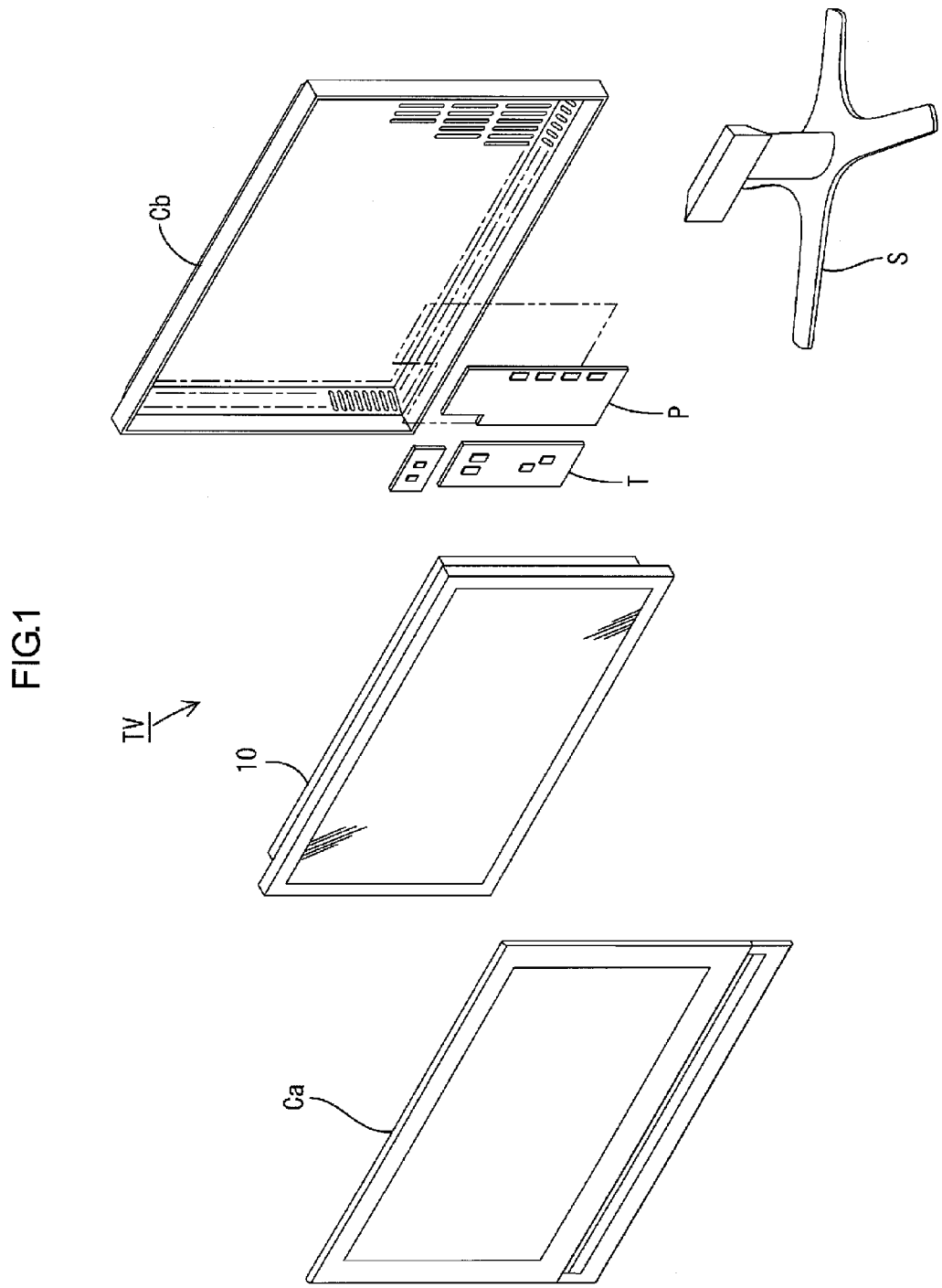
FIG. 1 is an exploded perspective view illustrating a schematic configuration of a television receiver according to a first embodiment of the present invention.
Figure 2:
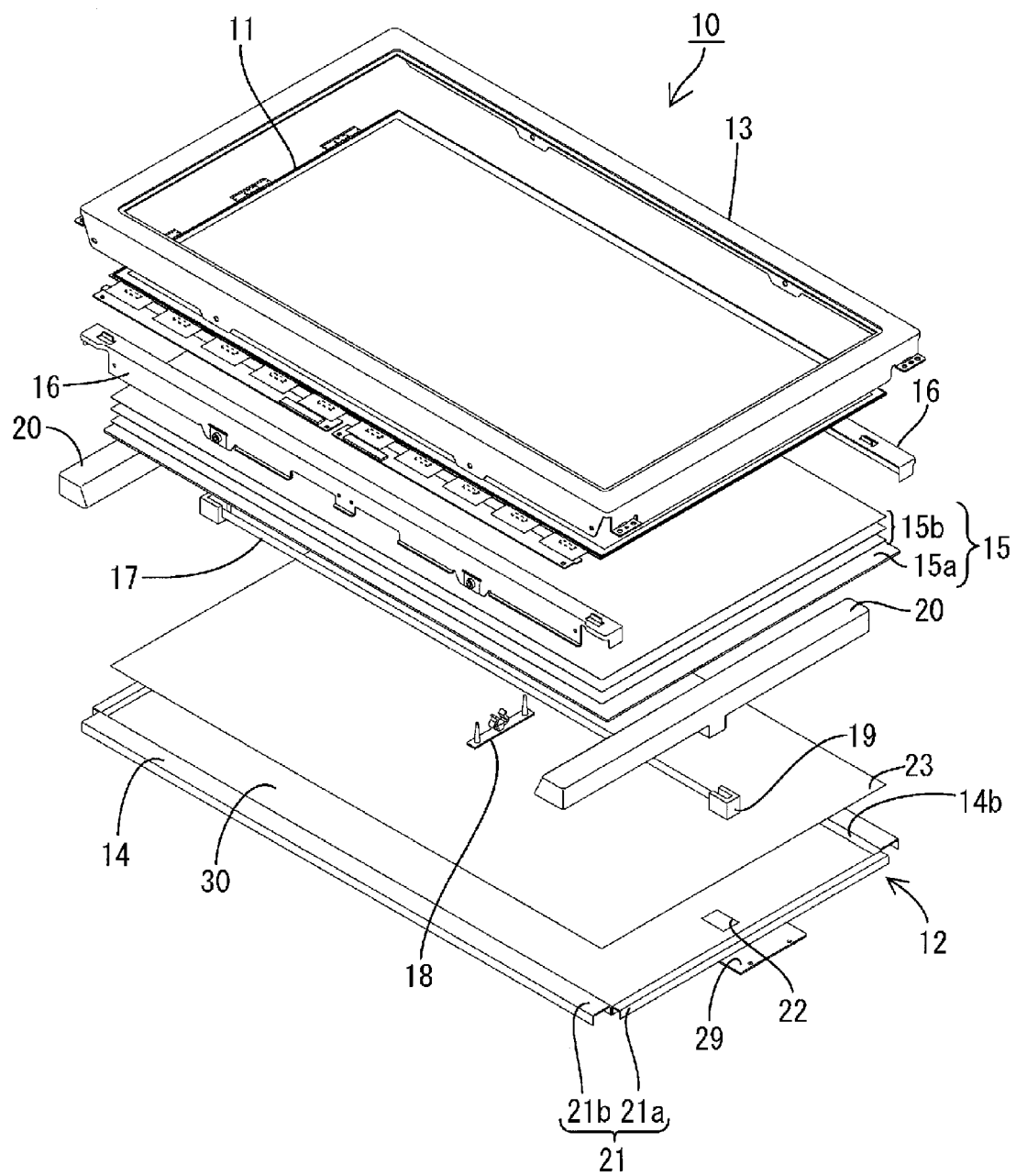
FIG. 2 is an exploded perspective view illustrating a schematic configuration of a liquid crystal display device included in the television receiver.

As illustrated in FIG. 1, the television receiver TV of the present embodiment includes the liquid crystal display device 10, front and rear cabinets Ca, Cb which house the liquid crystal display device 10 therebetween, a power source P, a tuner T and a stand S. An entire shape of the liquid crystal display device (display device) 10 is a landscape rectangular. The liquid crystal display device 10 is housed in a vertical position. As illustrated in FIG. 2, the liquid crystal display device 10 includes a liquid crystal panel 11 as a display panel, and a backlight unit (lighting device) 12 as an external light source. The liquid crystal panel 11 and the backlight unit 12 are integrally held by a frame shaped bezel 13 and the like.

Next, the liquid crystal panel 11 and the backlight unit 12 included in the liquid crystal display device 10 will be described (see FIGS. 2 to 4).

The liquid crystal panel (display panel) 11 is configured such that a pair of glass substrates is bonded together with a predetermined gap therebetween and liquid crystal is sealed between the glass substrates. On one of the glass substrates, switching components (for example, TFTs) connected to source lines and gate lines which are perpendicular to each other, pixel electrodes connected to the switching components, and an alignment film and the like are provided. On the other substrate, color filters having color sections such as R (red), G (green) and B (blue) color sections arranged in a predetermined pattern, counter electrodes, and an alignment film and the like are provided. Polarizing plates 11a, 11b are attached to outer surfaces of the substrates (see FIGS. 3 to 4).

As illustrated in FIG. 2, the backlight unit 12 includes a chassis 14, an optical sheet set 15 (a diffuser (optical member, optical diffusing member) 15a, and a plurality of optical sheets 15b which is provided between the diffuser 15a and the liquid crystal panel 11), and a frame 16. The chassis 14 has a substantially box-shape, and has an opening 14b on the light output side (on the liquid crystal panel 11 side). The optical sheet set 15 is provided so as to cover the opening 14b of the chassis 14. The frame 16 provided along a long side of the chassis 14 holds a long-side edge part of the diffuser 15a in a state where the long-side edge part is sandwiched between the frame 16 and the chassis 14. The chassis 14 further includes a hot cathode tube (light source) 17, a lamp clip 18 attaching the hot cathode tube 17 to the chassis 14, a relay connector 19 bearing relay of electric connection in each end of the hot cathode tube 17, and a holder 20 collectively covering the ends of the hot cathode tube 17 and the relay connector 19. In the backlight unit 12, a light exit side of the backlight unit 12 is a side closer to the diffuser 15a than the hot cathode tube 17.

The chassis 14 is made of metal. The chassis 14 is formed in a substantially shallow box shape through sheet metal forming. As illustrated in FIGS. 3 and 4, the chassis 14 includes a rectangular bottom plate 30 and folded outer edge portions 21 (folded outer edge portions 21a in a short-side direction and folded outer edge portions 21b in a long-side direction), each of which extends upright from the corresponding peripheral edge of the bottom plate 30 and has a substantially U shape. The chassis 14 has a plurality of attaching holes 22 attaching the relay connector 19 formed in both ends of a long-side direction of the bottom plate 30. Furthermore, as illustrated in FIG. 3, the chassis 14 includes fixing holes 14c formed in an upper surface of the folded outer edge portion 21b thereof to bind the bezel 13, the frames 16 and the chassis 14 and the like together with screws and the like.

The chassis 14 has a reflection sheet 23 provided on an inner surface (a surface facing the hot cathode tube 17) of the bottom plate 30 thereof. The reflection sheet 23 is made of a synthetic resin, and has a surface having white color that provides excellent light reflectivity. The reflection sheet 82 is provided along an inner surface of the bottom plate 30 of the chassis 14 to cover the almost entire chassis 14. As shown in FIG. 4, a long-side edge part of the reflection sheet 23 extends upright so as to cover a folded outer edge portion 21b of the chassis 14. The long-side edge area is sandwiched between the chassis 14 and the diffuser 15a. The light emitted from the hot cathode tube 17 can be reflected to the diffuser 15a side by the reflection sheet 23.

Figure 5:
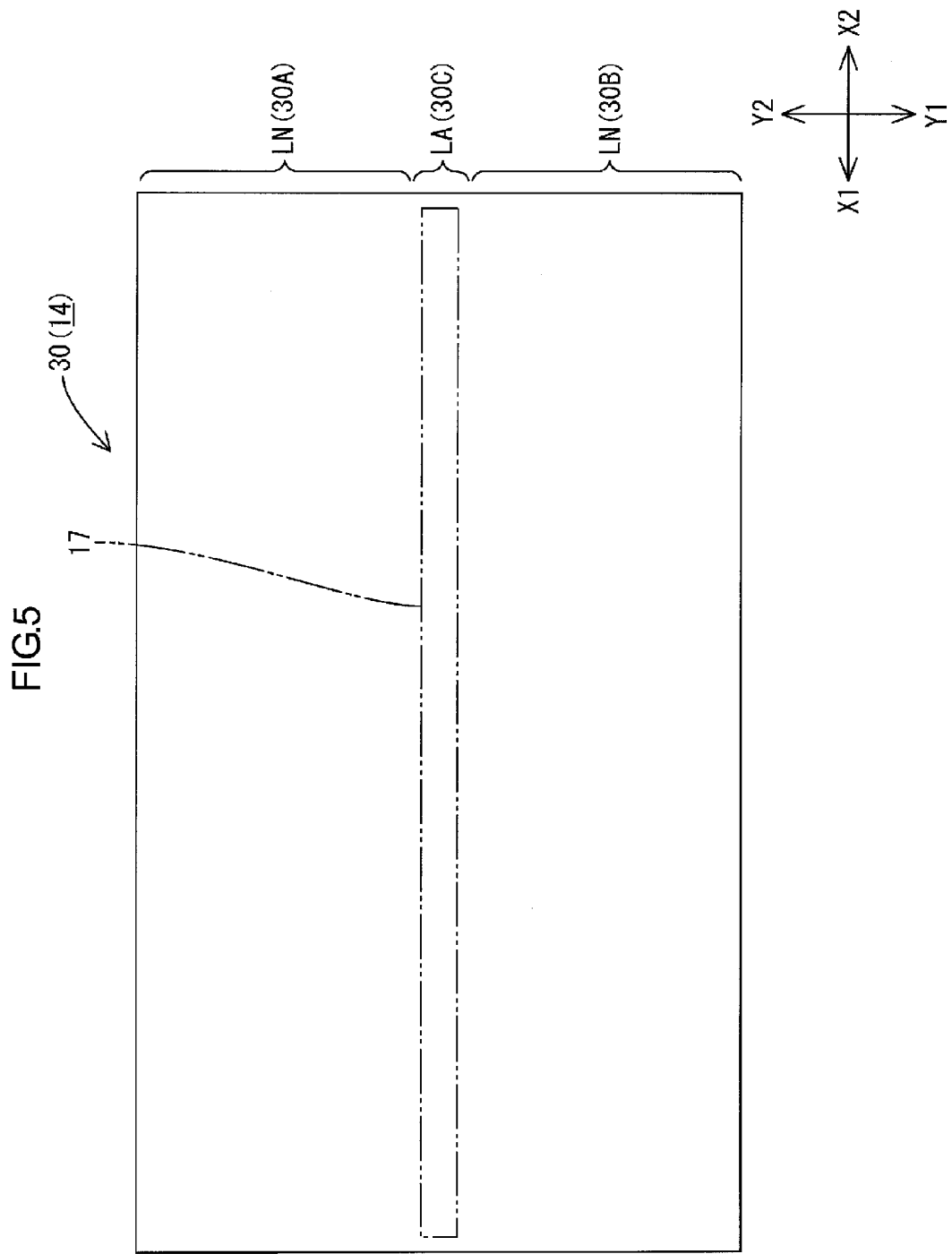
FIG. 5 is a plan view illustrating a schematic configuration of a chassis included in the liquid crystal display device.

The hot cathode tube 17 is housed in the chassis 14 with a longitudinal direction (axial direction) thereof aligned with a long-side direction of the chassis 14. As shown in FIG. 5, more specifically, the bottom plate 30 (a region facing the diffuser 15a) of the chassis 14 is divided into a first end area 30A, a second end area 30B located at an end on the opposite side of the first end area 30A, and a center area 30C sandwiched between the first end area 30A and the second end area 30B in a short-side direction thereof. In this case, the hot cathode tube 17 is arranged in the center area 30C of the bottom plate 30 to make a light source arrangement area LA. On the other hand, the hot cathode tube 17 is not arranged in the first end area 30A and the second end area 30B of the bottom plate 30 to make a light source non-arrangement area LN. That is, the chassis 14 has the light source arrangement area LA formed with the hot cathode tube 17 eccentrically-located in the center area in the short-side direction of the bottom plate 30. The light source arrangement area LA has an area smaller than an area of the light source non-arrangement area LN. A ratio of the area of the light source arrangement area LA to an area of the bottom plate 30 of the chassis 14 may be changed according to the number of the hot cathode tubes 17. However, the ratio is preferably in a range of 4% to 37% from the balance of power saving and brightness securement. In the present embodiment, the ratio is 4%.

Figure 3:
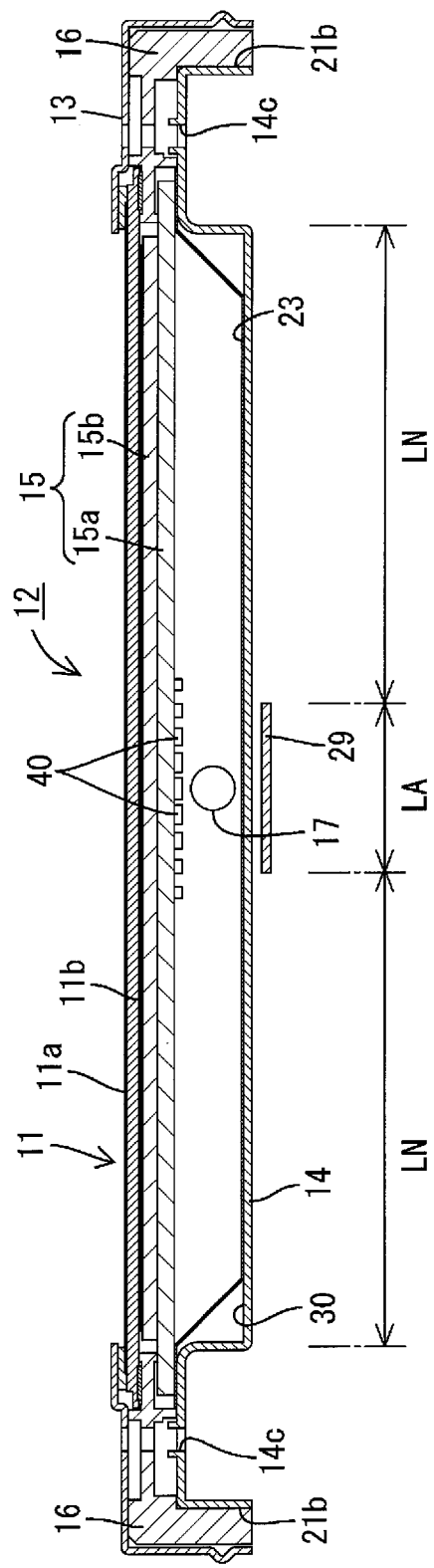
FIG. 3 is a cross-sectional view illustrating a cross-sectional configuration along a short-side direction of the liquid crystal display device.
Figure 4:
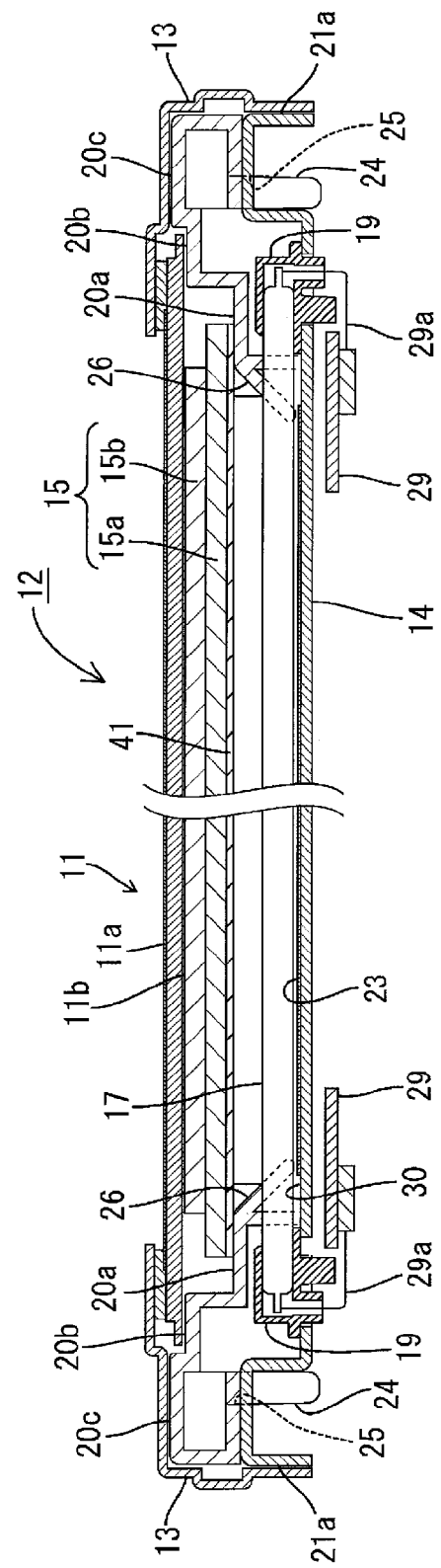
FIG. 4 is a cross-sectional view illustrating a cross-sectional configuration along a long-side direction of the liquid crystal display device.

As shown in FIGS. 3 and 4, the chassis 14 has an inverter board 29 attached to a position overlapping with the light source arrangement area LA on an outer surface (a surface located on the opposite side of a surface on which the hot cathode tube 17 is provided) of the bottom plate, more specifically, to a position overlapping with an end of the hot cathode tube 17, to supply driving power to the hot cathode tube 17 from the inverter board 29. Each end of the hot cathode tube 17 includes a terminal (not shown) receiving driving power. The terminal and a harness 29a (see FIG. 4) extending from the inverter board 29 are electrically connected, and thereby high-pressure driving power can be supplied. The electric connection is made in the relay connector 19 into which the end of the hot cathode tube 17 is inserted. The holder 20 is attached so as to cover the relay connector 19.

The holder 20 covering the end of the hot cathode tube 17 and the relay connector 19 is made of a white synthetic resin. As shown in FIG. 2, the holder 20 extends along a short-side direction of the chassis 14 and has a substantially elongated box-shape. As shown in FIG. 4, the holder 20 has a stepwise surface on which the diffuser 15a and the liquid crystal panel 11 can be placed at a different level on a front side thereof. The holder 20 is provided in a state where the holder 20 overlaps partially with a folded outer edge portion 21a in the short-side direction of the chassis 14. The holder 20 and the folded outer edge portion 21a constitute a side wall of the backlight unit 12. An insertion pin 24 is projected from the surface of the holder 20 facing the folded outer edge portion 21a of the chassis 14. The insertion pin 24 is inserted into an insertion hole 25 formed in an upper surface of the folded outer edge portion 21a of the chassis 14, and thereby the holder 20 is attached to the chassis 14.

The stepwise surface of the holder 20 covering the end of the hot cathode tube 17 includes three surfaces parallel to the bottom plate 30 of the chassis 14. A short-side edge part of the diffuser 15a is placed on a first surface 20a located in the lowest position. Furthermore, an inclination cover 26 inclined toward the bottom plate 30 of the chassis 14 extends from the first surface 20a. The short-side edge part of the liquid crystal panel 11 is placed on a second surface 20b as the stepwise surface of the holder 20. A third surface 20c placed in the highest position in the stepwise surfaces of the holder 20 is arranged in a position overlapping with the folded outer edge portion 21a of the chassis 14. The third surface 20c is brought into contact with the bezel 13.

The optical sheet set 15 including the diffuser (optical member, optical diffusing member) 15a and the optical sheets 15b is provided on the opening side 14b of the chassis 14. The diffuser 15a includes a plate-like member made of a synthetic resin and light scattering particles dispersed in the plate-like member. The diffuser 15a has a function for diffusing linear light emitted from the hot cathode tube 17 as the linear light sources and also has a function for reflecting the light emitted from the hot cathode tube 17. The short-side edge part of the diffuser 15a is placed on the first surface 20a of the holder 20 as described above, and does not receive a vertical restricting force. Thus, the diffuser 15a covers an opening 14b of the chassis 14.

The diffuser 15a has an optical sheet 15b thereon. The optical sheet 15b is obtained by laminating a diffusion sheet, a lens sheet, and a reflection type polarizing plate in this order from the diffuser 15a side. The optical sheet 15b has a function for converting light emitted from the hot cathode tube 17 and passed through the diffuser 15a into planar light. The optical sheet 15b has the liquid crystal panel 11 placed on the upper surface side thereof. The optical sheet 15b is sandwiched between the diffuser 15a and the liquid crystal panel 11.

The light reflection function of the diffuser 15a will be described with reference to FIGS. 6 to 10.

Figure 6:
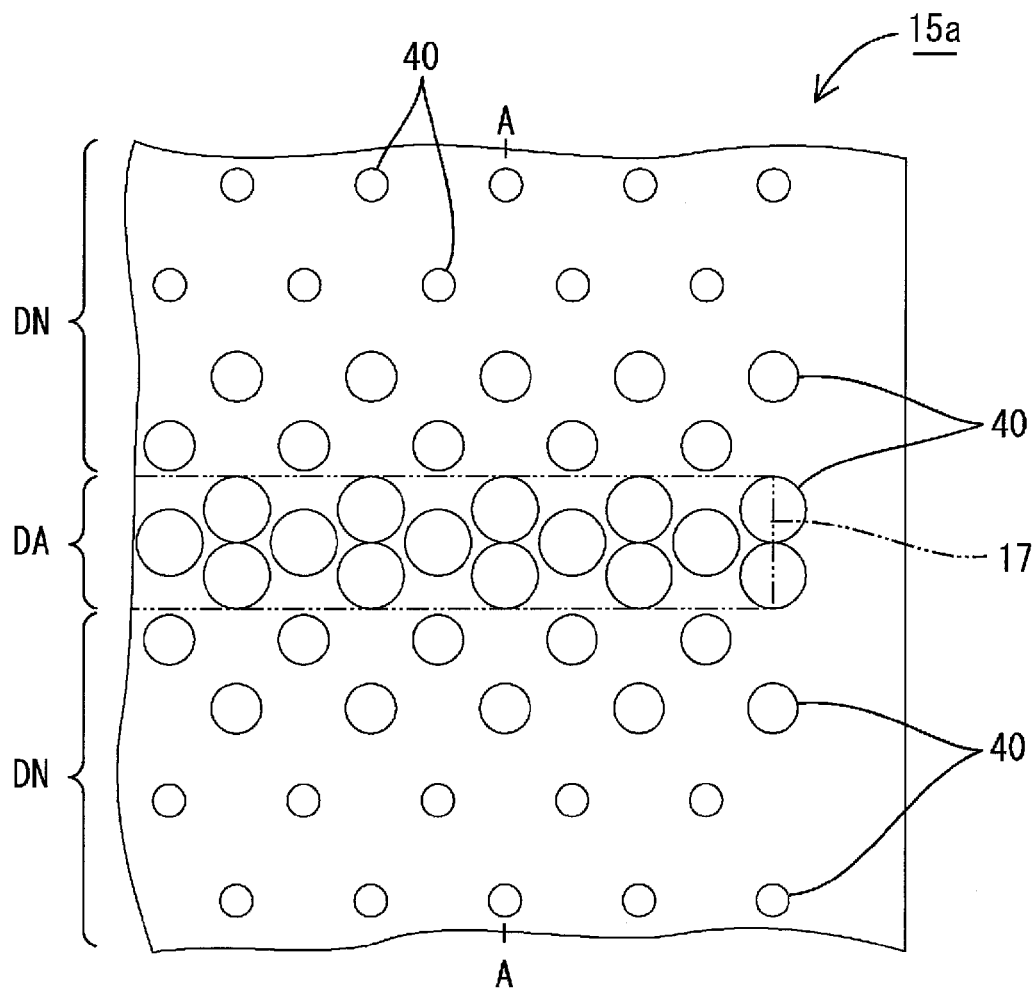
FIG. 6 is a schematic view illustrating an arranging mode of light reflection portions formed on an end area side in a diffuser included in a backlight unit.
Figure 7:
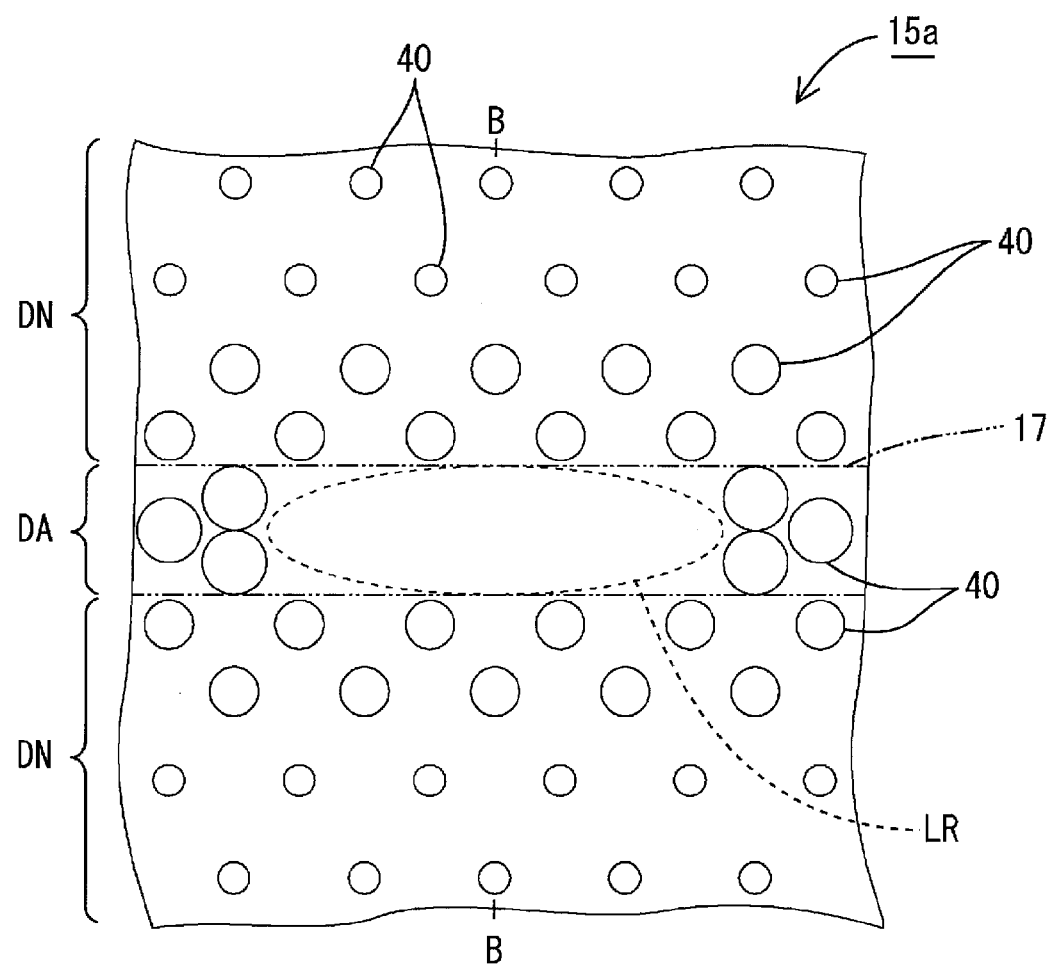
FIG. 7 is a schematic view illustrating an arranging mode of light reflection portions formed on a center area side in a diffuser included in a backlight unit.
Figure 8:
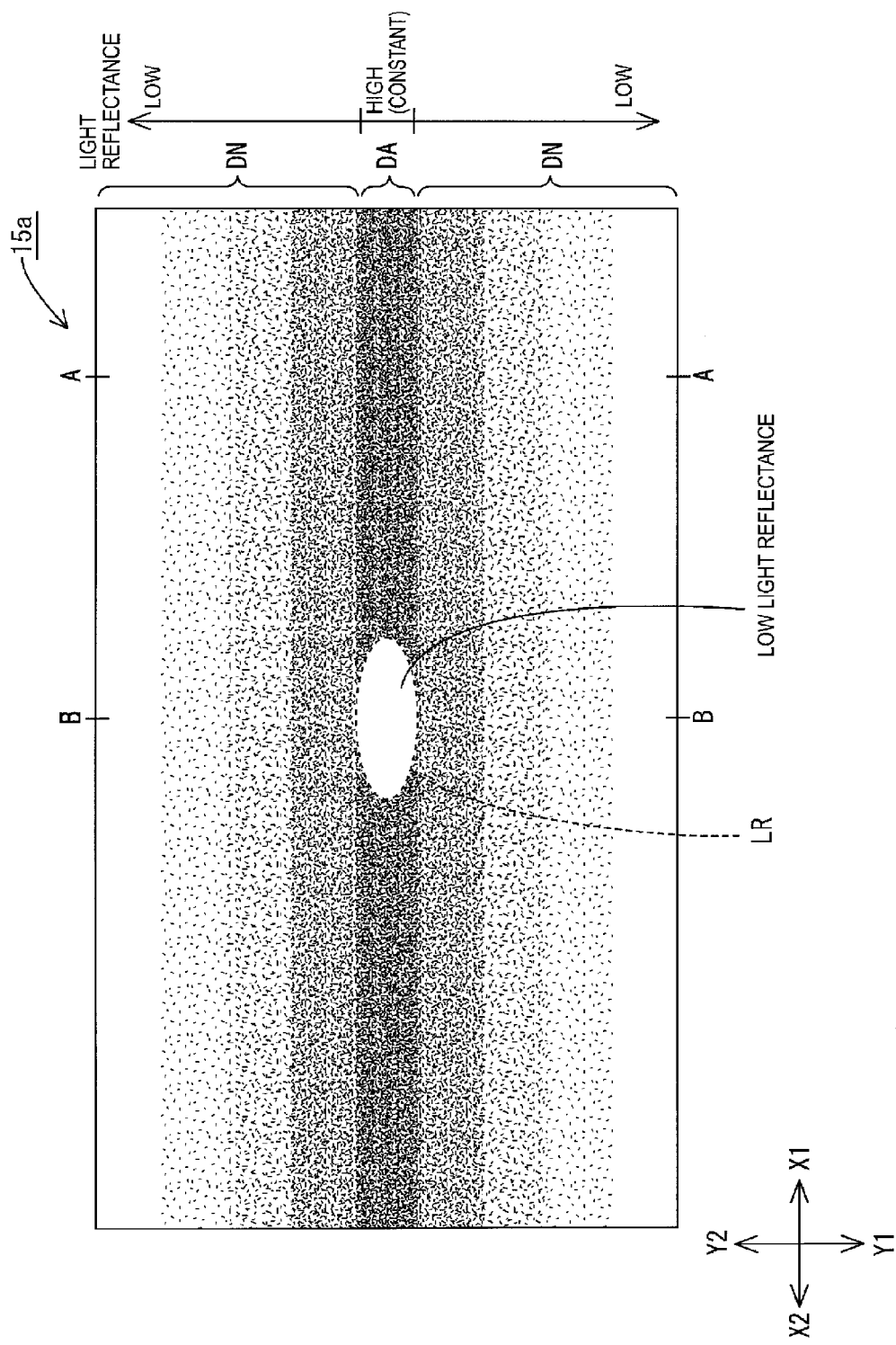
FIG. 8 is a plan view illustrating a distribution aspect of a light reflectance of a surface of the diffuser facing a hot cathode tube.
Figure 9:
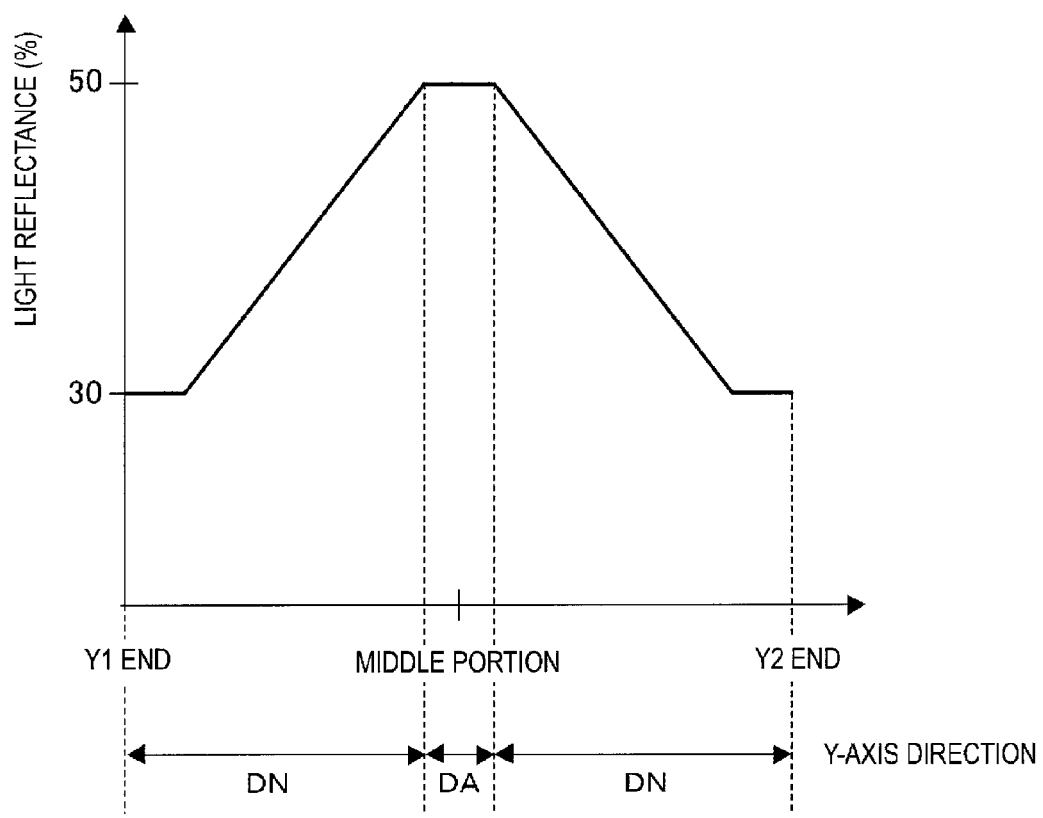
FIG. 9 is a graph showing a change in light reflectance in line A-A of a diffuser of FIG. 8.
Figure 10:
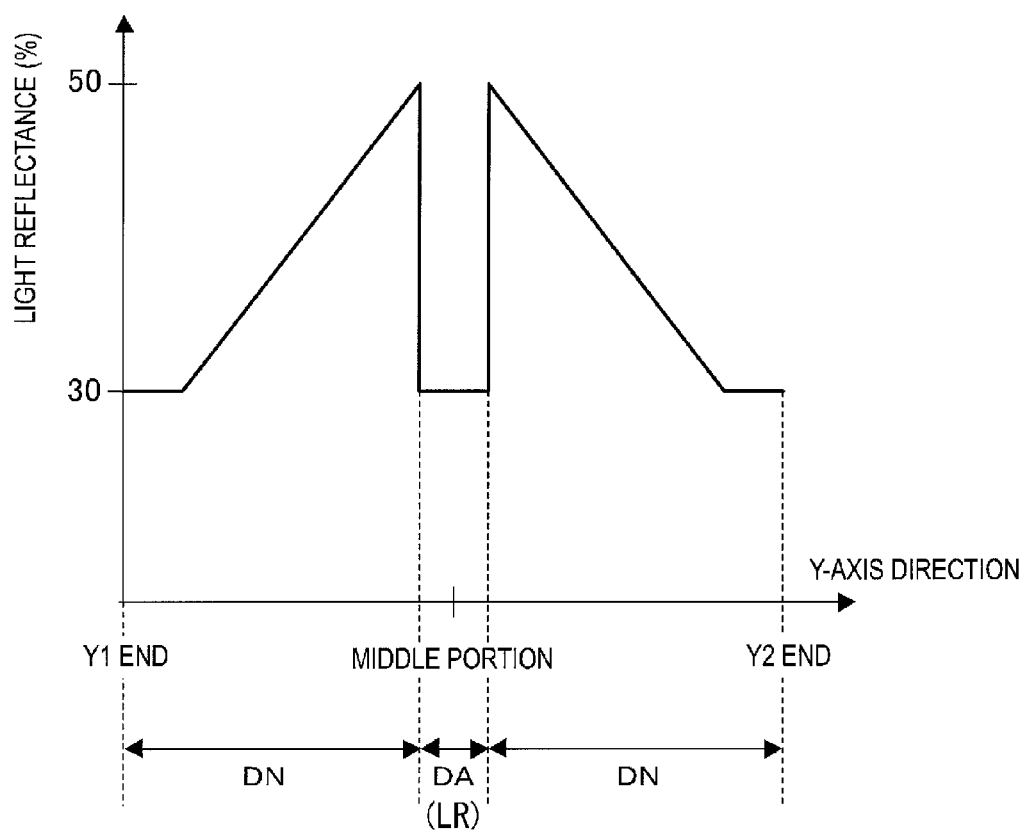
FIG. 10 is a graph showing a change in light reflectance in line B-B of a diffuser of FIG. 8.

FIG. 6 is a schematic view illustrating an arranging aspect of light reflection portions formed on an end area side of the diffuser. FIG. 7 is a schematic view illustrating an arranging aspect of light reflection portions formed on a center area side of the diffuser. FIG. 8 is a plan view illustrating a distribution aspect of a light reflectance of a surface of the diffuser facing a hot cathode tube. FIG. 9 is a graph illustrating a change in a light reflectance in line A-A of the diffuser of FIG. 8. FIG. 10 is a graph illustrating a change in a light reflectance in line B-B of the diffuser of FIG. 8. In FIGS. 6 to 10, a long-side direction of the diffuser is defined as an X-axis direction; a short-side direction thereof is defined as a Y-axis direction. In FIG. 9, a horizontal axis represents the Y-axis direction (short-side direction). FIG. 9 is a graph obtained by plotting light reflectance of a Y1 side end area (represented by A) of the Y-axis direction to a center, and of the center to a Y2 side end area (represented by A). In FIG. 10, a horizontal axis represents the X-axis direction (long-side direction). FIG. 10 is a graph obtained by plotting light reflectance of a X1 side end area (represented by B) of the X-axis direction to a center, and of the center to a X2 side end area (represented by B).

As illustrated in FIGS. 6 and 7, the diffuser 15a has light reflection portions 40 forming a white dot pattern provided on a surface facing the hot cathode tube 17. In the present embodiment, each dot of the light reflection portions 40 has a round shape. The dot pattern of the light reflection portions 40 is formed by printing paste containing metal oxide (titanium oxide and the like), for example, on the surface of the diffuser 15a. Preferable printing means are screen printing and inkjet printing and the like.

The light reflection portion 40 has a light reflectance of 80% in a surface facing the hot cathode tube 17. The light reflection portion 40 has a light reflectance relatively greater than a light reflectance of 30% in a surface of the diffuser 15a itself. In this context, in the present embodiment, the light reflectance of each material is represented by an average light reflectance inside the measurement diameter measured with an LAV of CM-3700d (measurement diameter f of 25.4 mm) manufactured by Konica Minolta. The light reflectance of the light reflection portion 40 is a value obtained by forming the light reflection portion 40 over an entire surface of a glass substrate and measuring the surface based on the above measuring means. The light reflectance of the light reflection portion 40 is preferably 80% or greater, and more preferably 90% or greater. Thus, as the light reflectance of the light reflection portion 40 is higher, the reflection degree can be controlled precisely and accurately according to an aspect of the dot pattern (the number of dots and the area of each dot and the like).

As illustrated in FIGS. 8 to 10, the light reflectance of the surface of the diffuser 15a facing the hot cathode tube 17 has a different distribution in every area according to a change in the dot pattern of the light reflection portions 40. That is, a light reflectance of a region (hereinafter, referred to as a light source overlapping portion DA) overlapping with the light source arrangement area LA (an area in which the hot cathode tube 17 is arranged) on the surface of the diffuser 15a facing the hot cathode tube 17 is greater than that of a region (hereafter, referred to as a light source non-overlapping portion DN) overlapping with the light source non-arrangement area LN (an area in which the hot cathode tube 17 is not arranged). More particularly, as illustrated in FIGS. 8 and 9, in the light source overlapping portion DA of the diffuser 15a, the light reflectance is set to 50% as a whole. The light source overlapping portion DA exhibits the greatest light reflectance in the diffuser 15a. On the other hand, in the light source non-overlapping portion DN of the diffuser 15a, the light reflectance is continuously and progressively decreased toward a side away from a side close to the light source overlapping portion DA. The light reflectance is set to 30% as the minimum value in the both end areas (a Y1 end and a Y2 end in FIG. 9) in the short-side direction (Y-axis direction) of the light source non-overlapping portion DN. In other words, the light reflection portions 40 are formed such that the light reflectance of the surface of the diffuser 15a facing the hot cathode tube 17 is continuously and progressively decreased toward a direction away from the hot cathode tube 17.

When the light reflectance of the light source overlapping portion DA in the diffuser 15a is great as in the present embodiment, light reaching from the hot cathode tube 17 is mostly reflected in the light source overlapping portion DA, which tends to reduce brightness of the light source overlapping portion DA. As further described, it is difficult to intentionally enhance brightness of a predetermined partial area in the light source overlapping portion DA.

As illustrated in FIGS. 7 and 8, in the diffuser 15a according to the present embodiment, the light source overlapping portion DA includes a low light reflectance area LR having a light reflectance smaller than that of a surrounding area in the light source overlapping portion DA. The low light reflectance area LR is formed in an area including a center of the diffuser 15a. The low light reflectance area LR has an elongated shape extending along a longitudinal direction of the hot cathode tube 17, more particularly, an elliptical shape having a long axis direction aligned with the longitudinal direction of the hot cathode tube 17.

As illustrated in FIG. 7, the light reflection portion 40 is not formed in the low light reflectance area LR. In other words, the light reflection portions 40 are formed in an area except the low light reflectance area LR in the diffuser 15a. Thereby, the light reflectance of the low light reflectance area LR is smaller than that of the surrounding area in the light source overlapping portion DA. As illustrated in FIGS. 9 and 10, specifically, the light reflectance of the light source overlapping portion DA is set to 50%. On the other hand, the light reflectance of the low light reflectance area LR is set to 30%, and is almost equal to a minimum value (light reflectance of the both end areas in the short-side direction of the diffuser 15a) of the light reflectance of the entire diffuser 15a.

The distribution of the light reflectance of the diffuser 15a is determined by dot areas of the light reflection portions 40. That is, the light reflectance of the light reflection portion 40 itself is greater than that of the diffuser 15a itself. Thereby, when the dot area of the light reflection portion 40 is relatively increased, the light reflectance can be relatively increased. When the dot area of the light reflection portion 40 is relatively decreased, the light reflectance can be relatively decreased. Specifically, each dot area of the light reflection portions 40 is relatively great and equal to each other in the light source overlapping portion DA of the diffuser 15a. The dot areas of the light reflection portions 40 are continuously decreased toward the both end areas in the short-side direction of the light source non-overlapping portion DN from a boundary between the light source overlapping portion DA and the light source non-overlapping portion DN. Each of the dot areas of the light reflection portions 40 as means for adjusting a light reflectance may be the same, and an interval between the dots of the light reflection portions 40 may be changed.

As described above, according to the present embodiment, the diffuser 15a has the light source overlapping portion DA overlapping with the light source arrangement area LA and the light source non-overlapping portion DN overlapping with the light source non-arrangement area LN. The light source overlapping portion DA has a surface facing the cathode tube 17, the surface having a light reflectance greater than that of the light source non-overlapping portion DN. The light source overlapping portion DA includes the low light reflectance area LR having a surface facing the cathode tube 17, the surface having a light reflectance smaller than that of the surrounding area in the light source overlapping portion DA.

Because light emitted from the hot cathode tube 17 arranged in the light source arrangement area LA first reaches the light source overlapping portion DA having a greater light reflectance in the diffuser 15a according to such a configuration, the light is mostly reflected (that is, not transmitted), to suppress brightness of illumination light to an emission amount of the light from the hot cathode tube 17. On the other hand, the light is reflected within the chassis 14, and can reach the light source non-arrangement area LN. Because the light source non-overlapping portion DN overlapping with the light source non-arrangement area LN in the diffuser 15a has a smaller light reflectance, more light is transmitted, and thereby brightness of predetermined illumination light can be obtained. Therefore, because an almost uniform brightness distribution can be entirely obtained without evenly arranging the hot cathode tubes 17 on the chassis 14, the configuration can contribute to cost reduction. In the light source overlapping portion DA having a greater light reflectance, light is mostly reflected, which tends to reduce brightness. For example, it is difficult to intentionally enhance brightness in a predetermined place such as the center area of the irradiation surface and the like. In the present embodiment, the light source overlapping portion DA of the diffuser 15a has a low light reflectance area LR having a light reflectance smaller than that of the surrounding area in the light source overlapping portion DA. Because the light from the hot cathode tubes 17 is hardly reflected in the low light reflectance area LR, the improvement in brightness of the intended area can be realized by arranging the low light reflectance area LR in the predetermined area.

In the present embodiment, the low light reflectance area LR is formed in an area including the center of the diffuser 15a. According to such a configuration, brightness in a center area of an irradiation surface of the backlight unit 12 can be improved. Therefore, high brightness in a center area of a display screen is achieved also in the liquid crystal display device 10 including the backlight unit 12. Because human eyes usually pay attention to the center area of the display screen, good visibility can be obtained by achieving high brightness in the center area of the display screen.

In the present embodiment, the low light reflectance area LR is formed into the elongated shape extending along the longitudinal direction of the hot cathode tube 17. Because the longitudinal direction of the low light reflectance area LR is aligned with the longitudinal direction of the hot cathode tube 17 according to such a configuration, light can be efficiently transmitted to the low light reflectance area LR.

In the present embodiment, the low light reflectance area LR has the elliptical shape, and the low light reflectance area LR has the long axis direction aligned with the longitudinal direction of the hot cathode tube 17. Thus, the low light reflectance area LR can be formed into the elliptical shape.

In the present embodiment, the light reflection portions 40 reflecting the light from the hot cathode tube 17 are formed on the surface facing the hot cathode tube 17 in at least the light source overlapping portion DA of the diffuser 15a. In this case, the light reflectance of the surface of the hot cathode tube 17 of the diffuser 15a can be suitably changed by the aspect of the light reflection portion 40.

In the present embodiment, the light reflection portions 40 are formed in an area except the low light reflectance area LR in the diffuser 15a. According to such a configuration, an amount of transmitted light in the low light reflectance area LR can sufficiently be secured, and the improvement in brightness in the low light reflectance area LR can further be realized.

In the present embodiment, the light reflection portions 40 include the dot pattern having light reflectivity. Thus, the light reflection portion 40 includes the dot pattern, and thereby a reflection degree can be controlled by the pattern aspect (number (density) and area and the like), and the improvement in brightness of the intended area can be easily realized.

In the present embodiment, the light reflection portions 40 are formed such that the light reflectance of the surface of the diffuser 15a facing the hot cathode tube 17 is continuously and progressively decreased toward a direction away from the hot cathode tube 17. Thus, the light reflectance of the diffuser 15a is gradated, more specifically, continuously and progressively decreased, and thereby a brightness distribution of the illumination light can be smoothed.

In the present embodiment, the light source arrangement area LA has the area smaller than the area of the light source non-arrangement area LN. Thus, the light source arrangement area LA has the area smaller than the area of the light source non-arrangement area LN, and thereby the number of the hot cathode tube 17 can further be reduced, and large effects can be expected in reduction in cost and power saving.

In the present embodiment, the chassis 14 has the portion facing the diffuser 15a, the portion divided into at least the first end area 30A, the second end area 30B located at the end on the opposite side of the first end area 30A, and the center area 30C sandwiched between the first end area 30A and the second end area 30B. The center area 30C is the light source arrangement area LA, and the first end area 30A and the second end area 30B are the light source non-arrangement areas LN. Thus, because sufficient brightness in the center area of the backlight unit 12 can be secured and brightness of a display center area is secured also in a liquid crystal display device including the backlight unit 12, the good visibility can be obtained.

In the present embodiment, the diffuser 15a is the optical diffusion member diffusing the light from the hot cathode tube 17. In this case, light transmission can be controlled in every area of the diffuser 15a by a light reflectance distribution of the diffuser 15a. In addition, light can be diffused by the optical diffusion member. Thereby, in-plane brightness can further be uniformed in the backlight unit 12.

The improvement in the brightness and the like can be attained by employing the hot cathode tube 17 as the light source as in the present embodiment.

<First Modification of First Embodiment>

Figure 11:
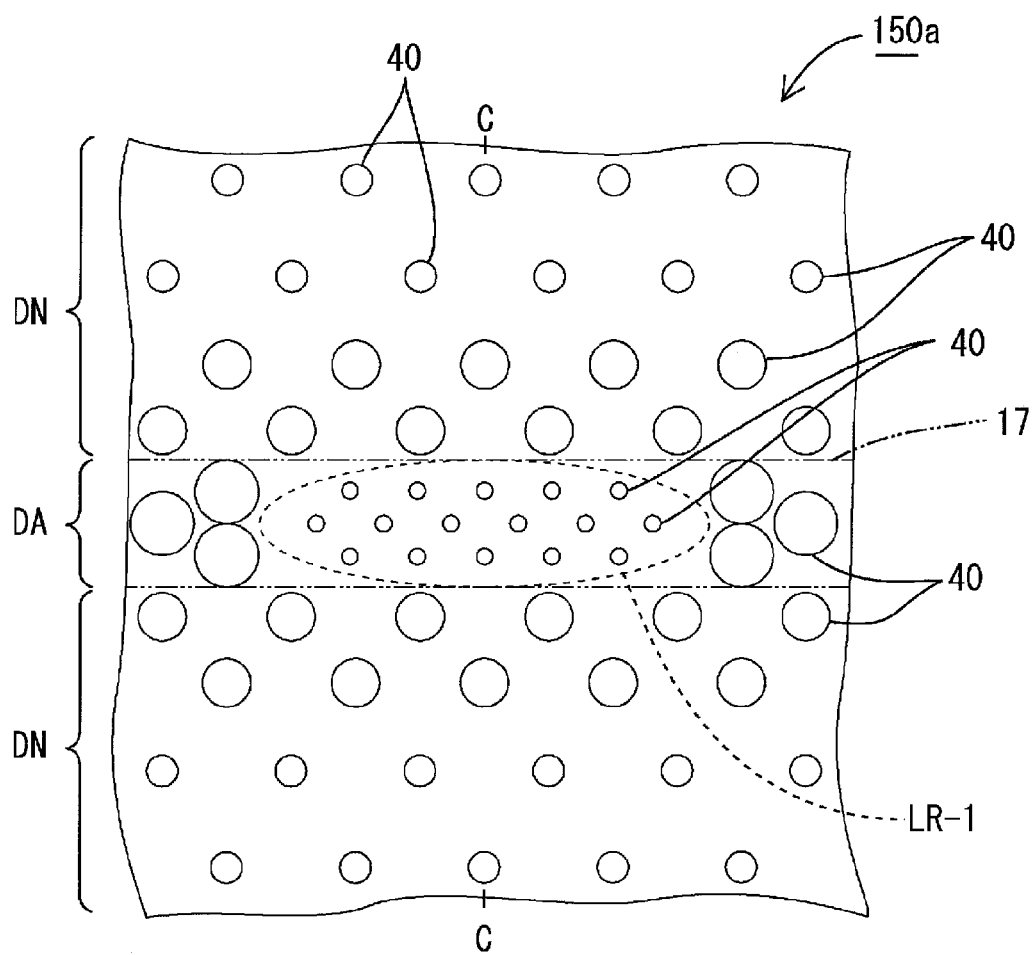
FIG. 11 is a schematic view illustrating a modification of the arranging aspect of the light reflection portion formed on the center area side of the diffuser.
Figure 12:
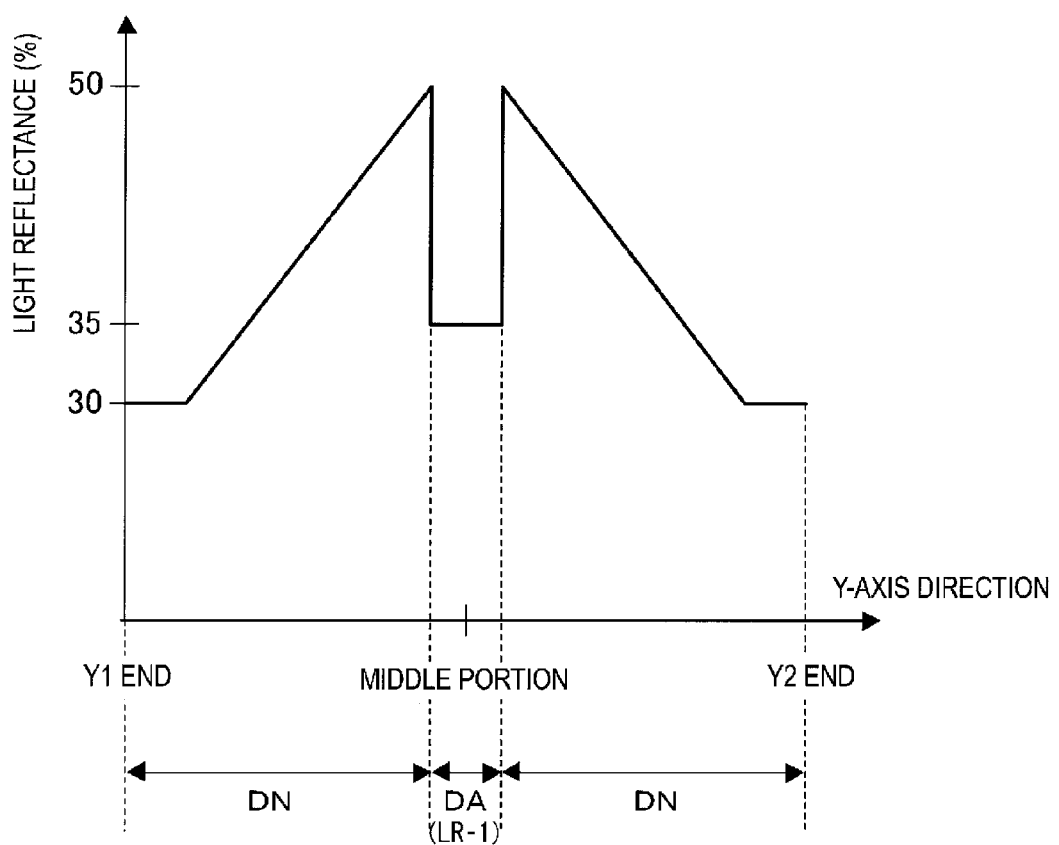
FIG. 12 is a graph illustrating a change in light reflectance in line C-C of a diffuser of FIG. 11.

A first modification of the first embodiment will be described using FIGS. 11 and 12. In this context, there is illustrated a configuration in which the light reflection portions 40 are formed also in a low light reflectance area LR-1. FIG. 11 is a schematic view illustrating an arranging aspect of light reflection portions formed on a diffuser according to the present modification. FIG. 12 is a graph showing a change in a light reflectance in line C-C of the diffuser of FIG. 11. In FIGS. 11 and 12, a long-side direction of the diffuser is defined as an X-axis direction; a short-side direction thereof is defined as a Y-axis direction. In FIG. 12, a horizontal axis represents the Y-axis direction (short-side direction). FIG. 12 is a graph obtained by plotting light reflectance of a Y1 side end area (represented by C) of the Y-axis direction to a center, and of the center to a Y2 side end area (represented by C). In this modification, the same constituent parts and constituent elements as those of the first embodiment are indicated by the same symbols, and will not be described.

The low light reflectance area LR-1 is formed on a surface of a diffuser 150a facing the hot cathode tube 17. As illustrated in FIG. 11, the light reflection portion 40 is formed in the low light reflectance area LR-1. Each light reflection portions 40 formed in the low light reflectance area LR-1 has a dot area smaller than a dot area of each light reflection portions 40 formed in a surrounding area of the low light reflectance area LR-1. Thereby, as illustrated in FIG. 12, the low light reflectance area LR-1 has a light reflectance smaller than that of the surrounding area thereof, and greater than a minimum vale of a light reflectance of the diffuser 150a. Specifically, the light reflectance of the surrounding area (light source overlapping portion DA) of the low light reflectance area LR-1 is set to 50%, for example, and the minimum value of the light reflectance of the diffuser 150a is set to 30%. On the other hand, the light reflectance of the low light reflectance area LR-1 is set to is set to 35%, for example. The dot areas of the light reflection portions 40 formed in the low light reflectance area LR-1 are the same, and thereby the light reflectance of the low light reflectance area LR-1 is almost constant over the entire low light reflectance area LR-1.

As described above, according to the present example, the light reflection portions 40 are provided also in the low light reflectance area LR-1 of the diffuser 150a. In this case, the difference between amounts of transmitted light of the low light reflectance area LR-1 and the surrounding area thereof can be suitably alleviated by the aspect of the light reflection portions 40 provided in the low light reflectance area LR-1.

<Second Modification of First Embodiment>

Figure 13:
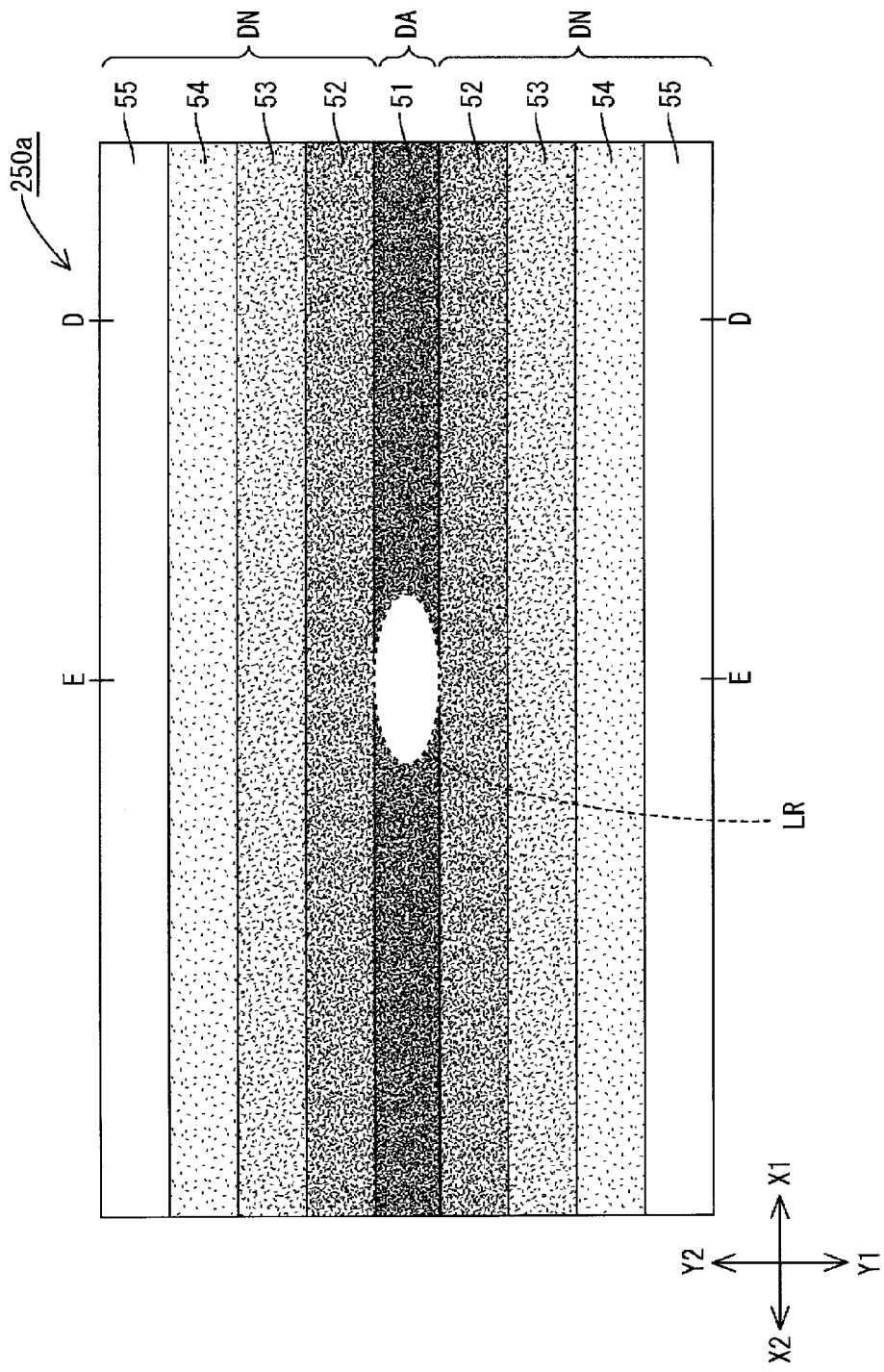
FIG. 13 is a plan view illustrating a modification of a distribution aspect of a light reflectance of a surface of the diffuser facing a hot cathode tube.
Figure 14:
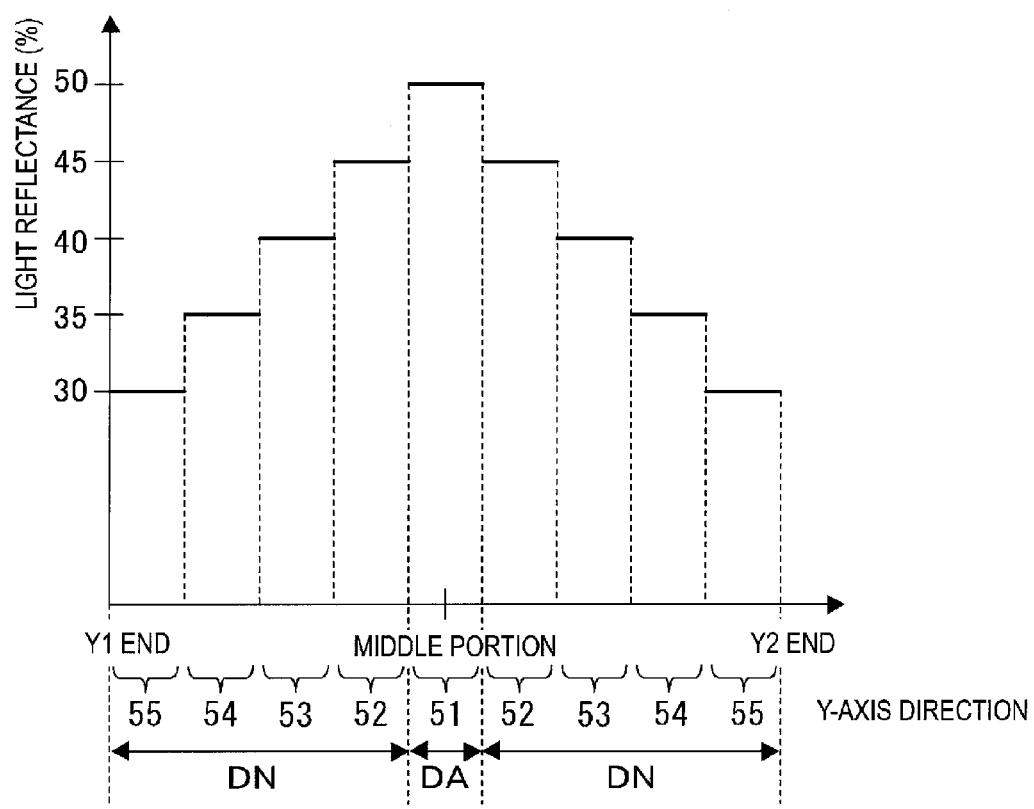
FIG. 14 is a graph showing a change in light reflectance in line D-D of FIG. 13.
Figure 15:
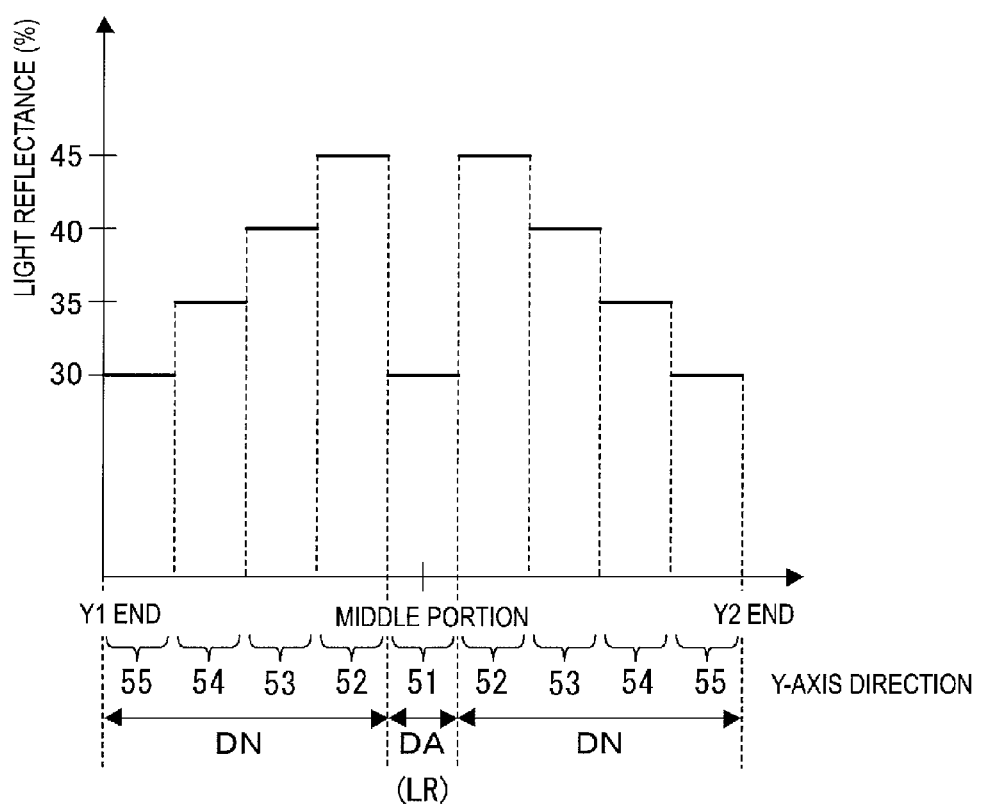
FIG. 15 is a graph showing a change in light reflectance in line E-E of FIG. 13.

A second modification of the first embodiment will be described using FIGS. 13 to 15. In this context, there is illustrated the second modification in which a distribution of a light reflectance in a surface of a diffuser 250a located on the hot cathode tube 17 side is changed. FIG. 13 is a plan view illustrating a modification of a distribution aspect of a light reflectance in a surface of a diffuser according to the present modification facing the hot cathode tube. FIG. 14 is a graph showing a change in a light reflectance in line D-D of the diffuser of FIG. 13. FIG. 15 is a graph showing a change in a light reflectance in line E-E of the diffuser of FIG. 13. In FIGS. 13 to 15, a long-side direction of the diffuser is defined as an X-axis direction; a short-side direction thereof is defined as a Y-axis direction. In FIG. 14, a horizontal axis represents the Y-axis direction (short-side direction). FIG. 14 is a graph obtained by plotting light reflectance of a Y1 side end area (represented by D) of the Y-axis direction to a center, and of the center to a Y2 side end area (represented by D). In FIG. 15, a horizontal axis represents the Y-axis direction (short-side direction). FIG. 15 is a graph obtained by plotting light reflectance of a Y1 side end area (represented by E) of the Y-axis direction to a center, and of the center to a Y2 side end area (represented by E). In this modification, the same constituent parts and constituent elements as those of the first embodiment are indicated by the same symbols, and will not be described.

As illustrated in FIGS. 13 to 15, in the diffuser 250a, a light source overlapping portion DA (region overlapping with the hot cathode tube 17) has the greatest light reflectance. On the other hand, the light reflectance is sequentially decreased in stepwise manner toward a side away from a side close to the light source overlapping portion DA in a light source non-overlapping portion DN (region which does not overlap with the hot cathode tube 17). More particularly, as illustrated in FIG. 13, the light source overlapping portion DA located in the center area of the diffuser 250a has a first area 51 having a greater light reflectance. The light source overlapping portion DA also has second areas 52 provided to surround the first area 51 and having a light reflectance smaller than that of the first area 51. Further, the light source overlapping portion DA also has third areas 53 provided to surround the second area 52 and having a smaller light reflectance than the second areas 52. The light source overlapping portion DA also has fourth areas 54 provided to surround the third area 53 and having a light reflectance smaller than that of the third areas 53. Furthermore, the light source overlapping portion DA has fifth areas 55 provided at the outer edge area of the diffuser 250a to surround the fourth areas 54 and having a light reflectance smaller than that of the fourth areas. That is, the light reflectance of the surface of the diffuser 250a facing the hot cathode tube 17 is sequentially decreased in stepwise manner toward a direction away from the hot cathode tube 17.

As illustrated in FIG. 14, in the present example, the light reflectance (light reflectance in line D-D) of a short-side direction (a direction orthogonal to the longitudinal direction of the hot cathode tube 17, the Y-axis direction) of the diffuser 250a in the first area 51 is 50%; the light reflectance in the second area 52, 45%; the light reflectance in the third area 53, 40%; the light reflectance in the fourth area 54, 35%; and the light reflectance in the fifth area 55, 30%. These are changed at an equal ratio. The above light reflectance is determined by changing the dot areas of the light reflection portions 40 in the first area 51 to the fourth area 54. The light reflection portion 40 is not formed in the fifth area 55. The fifth area 55 exhibits the light reflectance of the diffuser 250a itself.

A low light reflectance area LR is formed in an area including a center of the diffuser 250a. The light reflection portion 40 is not formed in the low light reflectance area LR. Therefore, the light reflectance of the low light reflectance area LR exhibits the light reflectance of the diffuser 250a itself. More particularly, as illustrated in FIG. 15, the light reflectance (light reflectance in line E-E) of the center area of the diffuser 250a is 30% in the end areas (Y1 end, Y2 end) of the short-side direction of the diffuser 250a. The light reflectance is increased in stepwise manner toward the center from the end area. The light reflectance of the center (the light source overlapping portion DA, the low light reflectance area LR) is smaller than the surround, and is 30% as in the end area.

Thus, the diffuser 250a has the plurality of areas 52, 53, 54, 55 having different light reflections. The light reflectance is decreased in order of the second area 52, the third area 53, the fourth area 54, and the fifth area 55, and thereby the light reflectance can be sequentially decreased in stepwise manner toward a side away from a side close to the light source overlapping portion DA (hot cathode tube 17).

According to such a configuration, a brightness distribution of illumination light in the light source non-overlapping portion DN (light source non-arrangement area LN) can be smoothed. Consequently, a smoothed illumination brightness distribution can be realized as the entire backlight unit 12. Furthermore, means for forming the plurality of areas 52, 53, 54, 55 having different light reflections can simplify a manufacturing method of the diffuser 250a, to contribute to cost reduction.

Second Embodiment

Next, a second embodiment of the present invention will be described with reference to FIGS. 16 and 17. In the second embodiment, there is illustrated the arranging aspect of the light source changed from the first embodiment. The other configurations are same as those of the above first embodiment. The same constituent parts as those of the above first embodiment are indicated by the same symbols without repeating overlapping descriptions.

Figure 16:
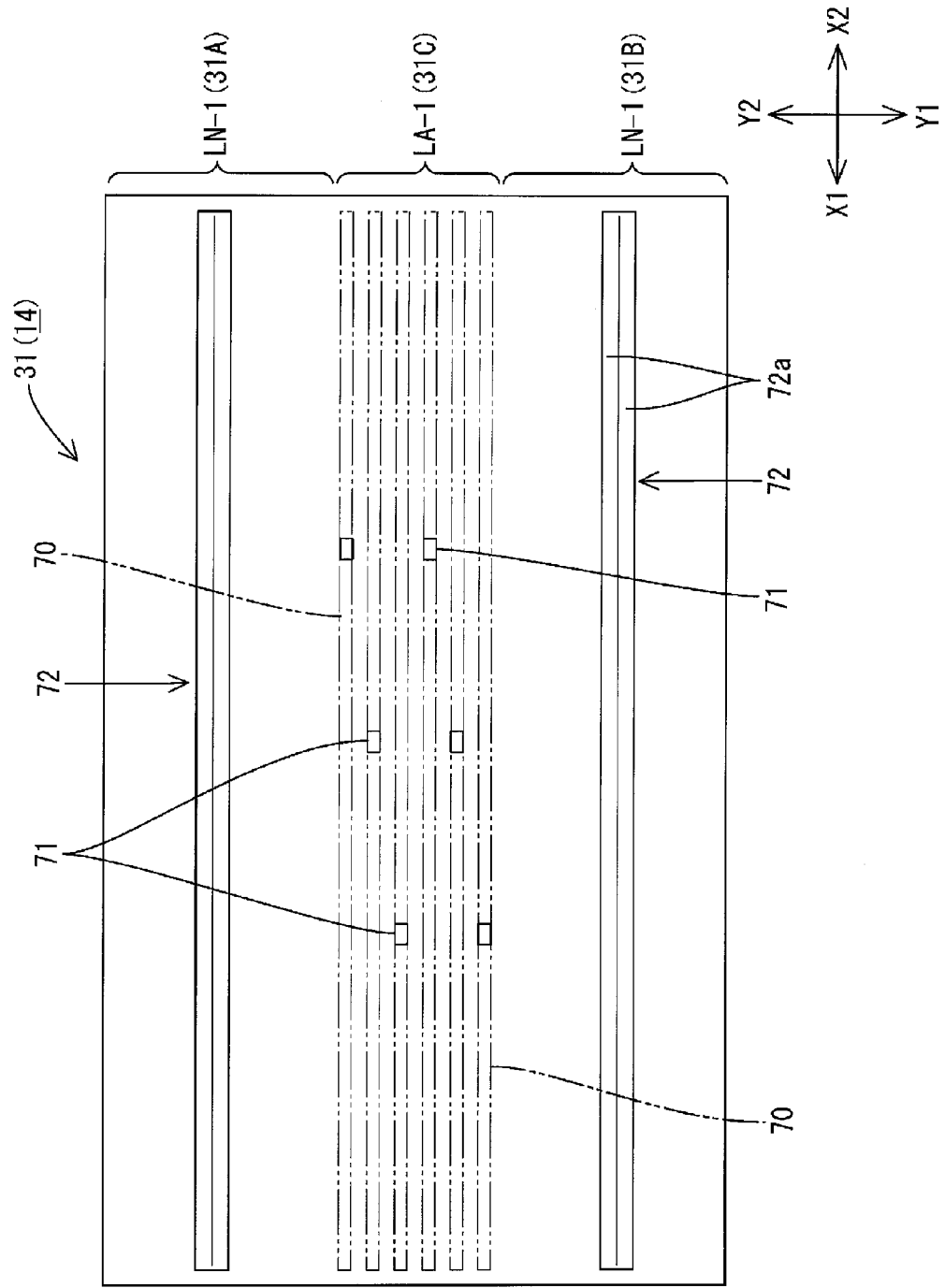
FIG. 16 is a plan view illustrating a schematic configuration of a chassis included in a backlight unit according to a second embodiment of the present invention.
Figure 18:
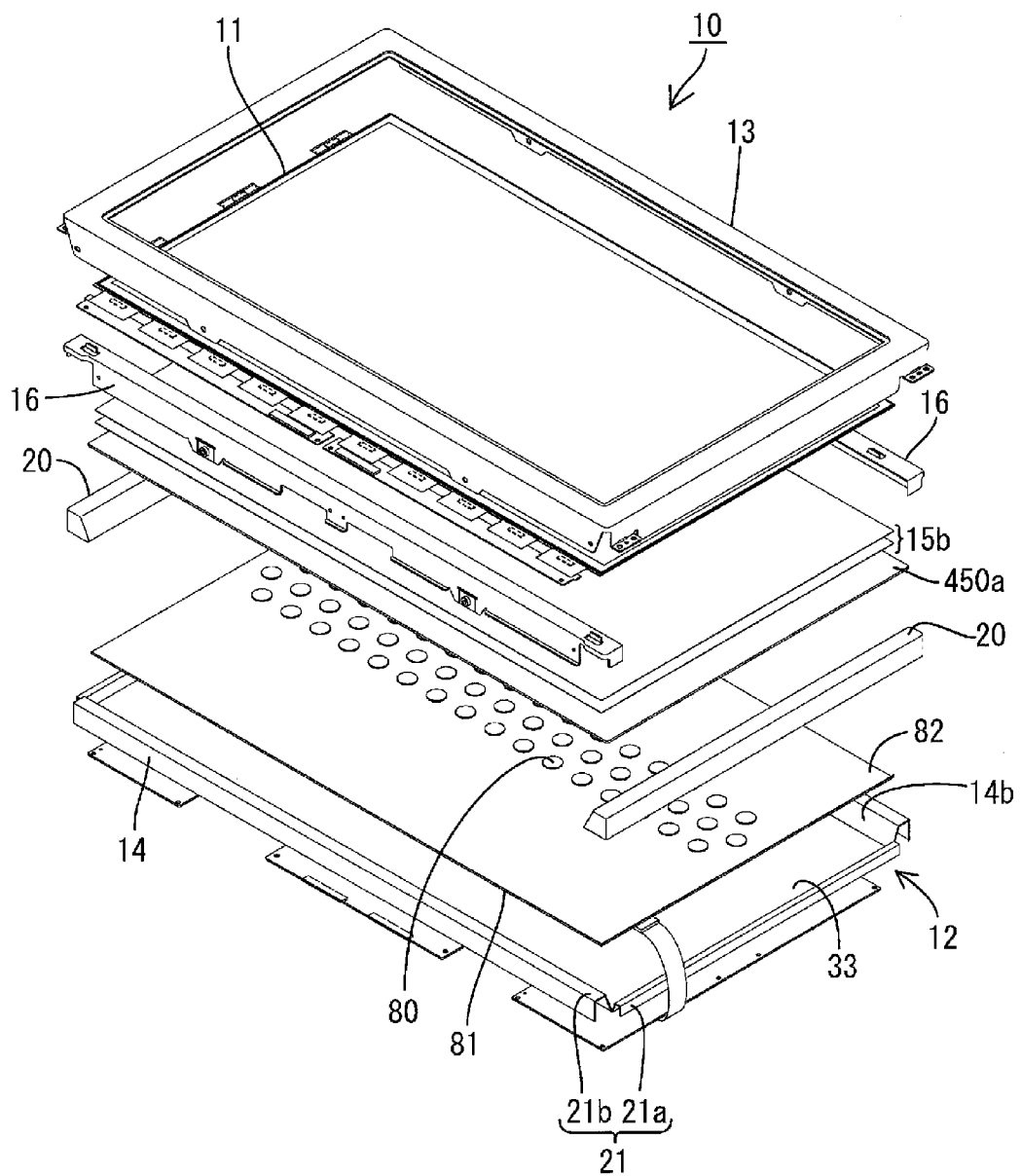
FIG. 18 is an exploded perspective view illustrating a schematic configuration of a liquid crystal display device according to a third embodiment of the present invention.

FIG. 16 is a plan view illustrating a schematic configuration of a chassis included in a backlight unit. FIG. 18 is a schematic view illustrating the arranging aspect of light reflection portions formed on a surface of the diffuser facing the cold cathode tube.

A cold cathode tube 70 has a diameter of 4.0 mm, and has an elongated cylindrical shape. The numerous (in this context, six) cold cathode tubes 70 are housed in the chassis 14 in a state where the cold cathode tubes 70 are arranged parallel to each other and eccentrically-located with a length direction (axial direction) thereof aligned with the long-side direction of the chassis 14. As shown in FIG. 16, more specifically, the bottom plate 31 (a region facing the diffuser 350a) of the chassis 14 is divided into a first end area 31A, a second end area 31B located at an end on the opposite side of the first end area 31A, and a center area 31C sandwiched between the first end area 31A and the second end area 31B in a short-side direction thereof. In this case, the cold cathode tube 70 is arranged in the center area 31C of the bottom plate 31 to make a light source arrangement area LA-1. On the other hand, the cold cathode tube 70 is not arranged in the first end area 31A and the second end area 31B of the bottom plate 31 to make a light source non-arrangement area LN-1. A ratio of the area of the light source arrangement area LA-1 to an area of the bottom plate 31 of the chassis 14 may be changed according to the number of the cold cathode tubes 70. However, the ratio is preferably in a range of 20% to 60% from the balance of power saving and brightness securement. In the present embodiment, the ratio is 30%.

In the light source arrangement area LA-1 of the bottom plate 31 of the chassis 14, the cold cathode tubes 70 are held by lamp clips (not shown). Thereby, each cold cathode tube 70 is supported with a small space formed between the cold cathode tube 70 and the bottom plate 31 of the chassis 14. Furthermore, heat transfer members 71 are interposed in the space such that the heat transfer members 71 are brought into contact with some cold cathode tubes 70 and the bottom plate 31. Because heat is transferred to the chassis 14 through the heat transfer member 71 from the cold cathode tube 70 heated to a high temperature at the time of lighting, the temperature of the cold cathode tube 70 can be decreased in a region where each heat transfer member 71 is arranged, to forcibly form a coldest point. As a result, brightness per one cold cathode tube 70 can be enhanced, which can contribute to power saving.

Each light source non-arrangement area LN-1 of the bottom plate 31 of the chassis 14, that is, each of the first end area 31A and the second end area 31B of the bottom plate 31, has a V-shaped reflection portion 72 extends along the long-side direction of the bottom plate 31. The V-shaped reflection portion 72 is made of a synthetic resin, and has a surface having white color that provides excellent light reflectivity. The V-shaped reflection portion 72 has two inclined surfaces 72a, 72a facing the cold cathode tube 70 and inclined toward the bottom plate 31. A longitudinal direction of the V-shaped reflection portion 72 extends along an axial direction of the cold cathode tube 70 arranged in the light source arrangement area LA-1. Light emitted from the cold cathode tube 70 is directed to the diffuser 350a side by one inclined surface 72a. Because the light emitted from the cold cathode tube 70 can be reflected to the diffuser 350a side by the inclined surface 72a of the V-shaped reflection portion 72, the emitted light can be effectively used.

Figure 17:
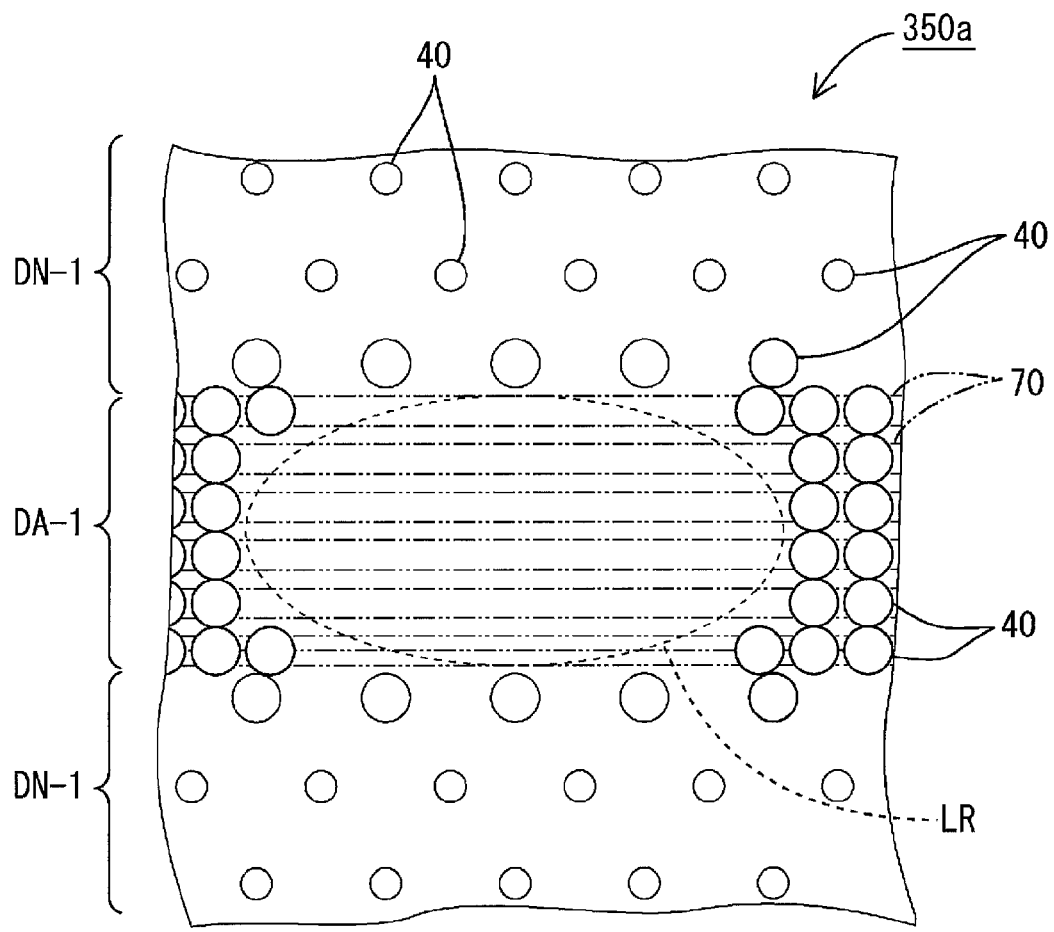
FIG. 17 is a schematic view illustrating an arranging mode of light reflection portions formed on a surface facing a cold cathode tube in a diffuser.

As illustrated in FIG. 17, the diffuser 350a has light reflection portions 40 forming a white dot pattern provided on a surface facing the cold cathode tube 70. The dot pattern of the light reflection portions 40 are formed by printing paste containing metal oxide (titanium oxide and the like) having excellent light reflectivity on the surface of the diffuser 350a. The light reflection portions 40 are formed such that the dot areas are different in every area of the diffuser 350a. That is, the dot area of each light reflection portion 40 is the greatest in a region (hereinafter, referred to as a light source overlapping portion DA-1) overlapping with the cold cathode tube 70 in the short-side direction of the diffuser 350a (a direction orthogonal to the longitudinal direction of the cold cathode tube 70, the Y-axis direction). The dot areas of the light reflection portions 40 are continuously decreased toward a side away from a side close to the light source overlapping portion DA-1 in a region (hereinafter, referred to as a light source non-overlapping portion DN-1) which does not overlap with the cold cathode tube 70. Therefore, the light reflectance of the diffuser 350a is the greatest in the light source overlapping portion DA-1. The light reflectance is continuously decreased toward a side away from a side close to the light source overlapping portion DA-1 in the light source non-overlapping portion DN-1.

In the light source overlapping portion DA-1 of the diffuser 350a, the low light reflectance area LR having an elliptical shape is formed in the area including the center of the diffuser 350a. The light reflection portion 40 is not formed in the low light reflectance area LR. Therefore, the light reflectance of the low light reflectance area LR is smaller than that of the surrounding area in the light source overlapping area DA-1. More particularly, the light reflectance of the low light reflectance area LR is the light reflectance of the diffuser 350a itself, which indicates a minimum value within the diffuser 350a.

According to the configuration described above, the light emitted from the cold cathode tube 70 first reaches the light source overlapping portion DA-1 of the diffuser 350a. Because the light reflectance of the light source overlapping portion DA-1 is increased by forming the light reflection portions 40, the reaching light is mostly reflected. The brightness of illumination light is suppressed to the emission amount of light from the cold cathode tube 70. On the other hand, the light is reflected within the chassis 14, and can reach the light source non-arrangement area DN-1. Because the light source non-overlapping portion DN-1 has a smaller light reflectance, more light is transmitted, and thereby brightness of predetermined illumination light can be obtained. Thus, an almost uniform brightness distribution can be obtained as the whole backlight unit 12. In the present embodiment, the light source overlapping portion DA-1 of the diffuser 350a has a low light reflectance area LR having a light reflectance smaller than that of the surrounding area in the light source overlapping portion DA-1. Because the light from the cold cathode tubes 70 is hardly reflected in the low light reflectance area LR, the improvement in brightness of the intended area can be realized by arranging the low light reflectance area LR in the predetermined area.

The longer service life and the like can be achieved by employing the cold cathode tube 70 as the light source, and the light modulation can be easily performed as in the present embodiment.

Third Embodiment

Figure 19:
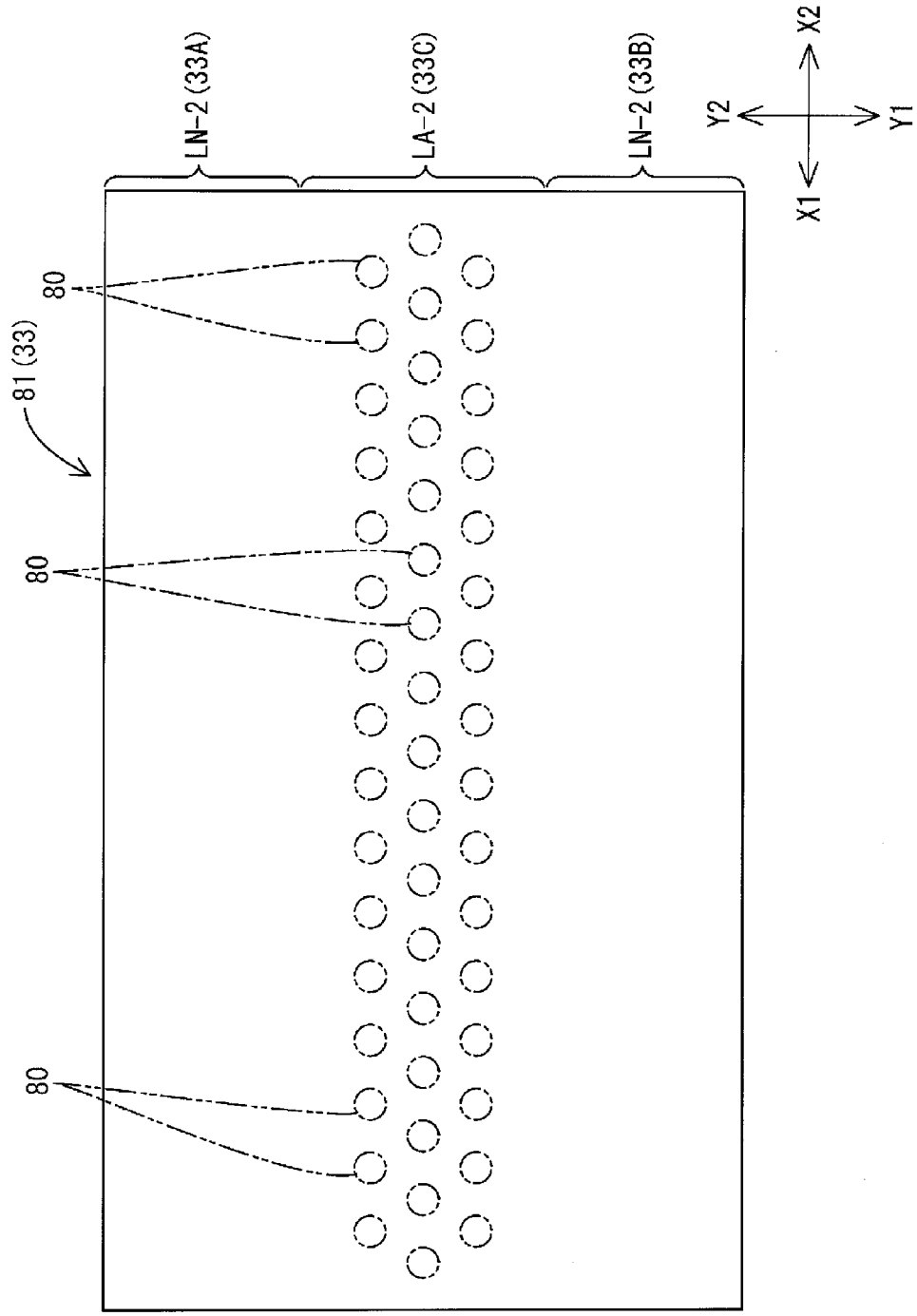
FIG. 19 is a schematic plan view of a chassis illustrating an arranging aspect of LED light sources included in a liquid crystal display device of FIG. 18.

Next, a third embodiment of the present invention will be described with reference to FIGS. 18 to 20. In the third embodiment, there is illustrated the arranging aspect of the light source changed from the first embodiment. The other configurations are same as those of the above first embodiment. The same constituent parts as those of the above first embodiment are indicated by the same symbols without repeating overlapping descriptions.

FIG. 18 is an exploded perspective view illustrating a schematic configuration of a liquid crystal display device. FIG. 19 is a schematic plan view of a chassis illustrating an arranging aspect of LED light sources. FIG. 20 is a schematic view illustrating an arranging aspect of light reflection portions formed on a surface of a diffuser facing the LED light sources.

As illustrated in FIG. 18, an LED board 81 to which LED light sources (light source) 80 are attached is arranged on an inner surface of a bottom plate 33 of the chassis 14. The LED board 81 has a reflection sheet 82 laid on a light exit side surface, that is, a surface facing the diffuser 450a, and a plurality of LED light sources 80 surrounded by the reflection sheet 82, that is, provided so as to exposed from openings (not shown) formed in the reflection sheet 82. As illustrated in FIG. 19, the LED light sources 80 are arranged parallel to each other so as to be an elongated shape along a long-side direction of the bottom plate 33 of the chassis 14. Although one LED board 81 is used for the liquid crystal panel 11 in the present embodiment, for example, the LED board 81 may be divided into multiple, to properly arrange the plurality of LED boards 81 in a plane.

The reflection sheet 82 provided on the LED board 81 is made of a synthetic resin, and has a surface having white color that provides excellent light reflectivity. The reflection sheet 82 is laid so as to cover an almost entire area except a portion of the LED board 81 on which the LED light sources 80 are provided.

The LED light sources 80 emit white color light. For example, three kinds of red, green, and blue LED chips may be face-mounted. Alternatively, the LED light sources 80 may be obtained by combining a blue LED chip with a yellow fluorescent material. As illustrated in FIG. 19, the LED light sources 80 are arranged in a center area 33C of the bottom plate 33 of the chassis 14, to form a light source arrangement area LA-2 herein. On the other hand, a first end area 33A and a second end area 33B of the bottom plate 33 are light source non-arrangement areas LN-2 on which the LED light source 80 is not arranged. The LED light sources 80 are arranged in a plane in a hexagonal closest form. All distances between the adjacent LED light sources 80 and 80 are equivalent.

Figure 20:
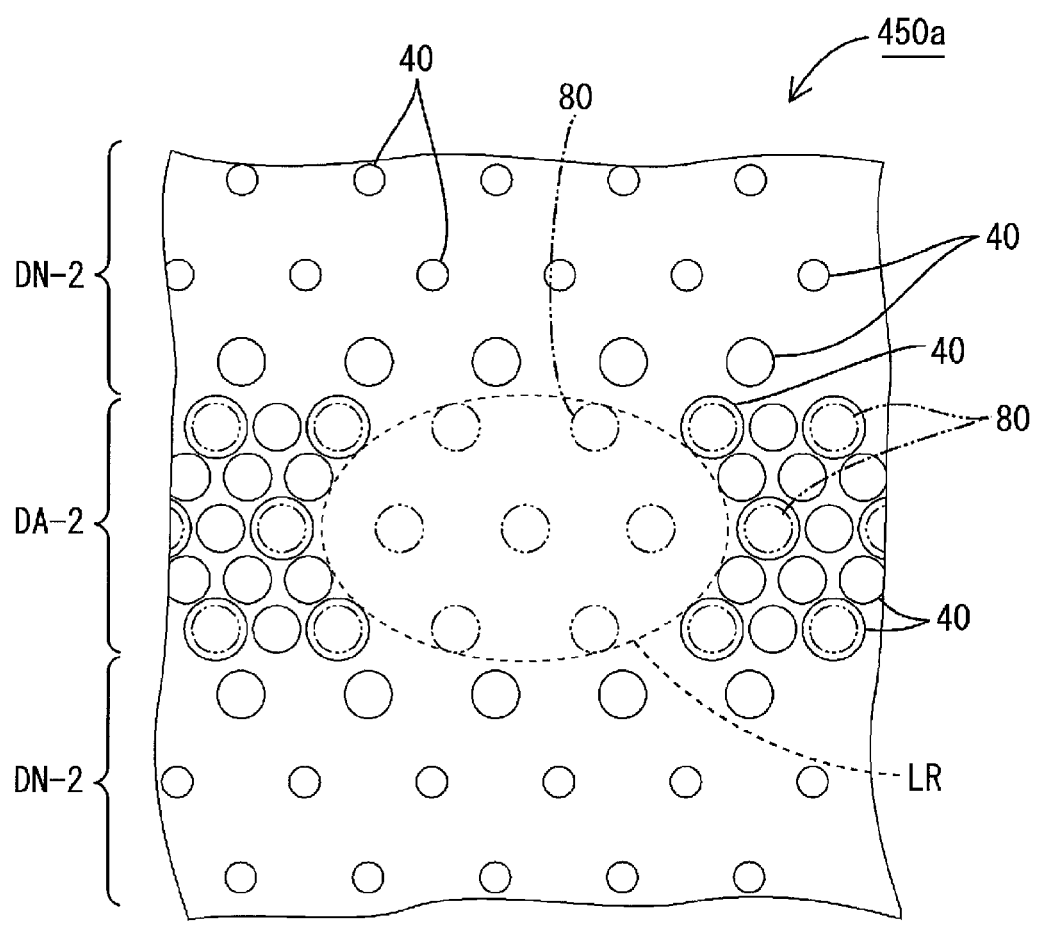
FIG. 20 is a schematic view illustrating an arranging mode of light reflection portions formed on a surface facing the LED light sources in a diffuser included in a liquid crystal display device of FIG. 18.

As illustrated in FIG. 20, the diffuser 450a has light reflection portions 40 forming a white dot pattern provided on a surface facing the LED light sources 80. The dot pattern of the light reflection portions 40 are formed by printing paste containing metal oxide (titanium oxide and the like) having excellent light reflectivity on the surface of the diffuser 450a. The light reflection portions 40 are formed such that the dot areas are different in every area of the diffuser 450a. That is, the dot areas of the light reflection portions 40 are greater in a region of the diffuser 450a (hereinafter, referred to as a light source overlapping portion DA-2) overlapping with the light source arrangement area LA-2. The dot areas of the light reflection portions 40 are smaller in a region (hereinafter, referred to as a light source non-overlapping portion DN-2) overlapping with the light source non-arrangement area LN-2. More particularly, the light reflection portions 40 are formed over the entire region overlapping with the LED light sources 80, in other words, such that the dots are painted out without clearances in the light source overlapping portion DA-2. The dot areas of the light reflection portions 40 are continuously decreased toward a direction away from light source overlapping portion DA-2 in the light source non-overlapping portion DN-2.

In the light source overlapping portion DA-2 of the diffuser 450a, the low light reflectance area LR having an elliptical shape is formed in the area including the center of the diffuser 450a. The light reflection portion 40 is not formed in the low light reflectance area LR. Therefore, the light reflectance of the low light reflectance area LR is smaller than that of the surrounding area in the light source overlapping area DA-2. More particularly, the light reflectance of the low light reflectance area LR is the light reflectance of the diffuser 450a itself, which indicates a minimum value within the diffuser 450a.

According to the configuration described above, the light emitted from the LED light source 80 first reaches the light source overlapping portion DA-2 of the diffuser 450a. Because the light reflectance of the light source overlapping portion DA-2 is increased by forming the light reflection portions 40, the reaching light is mostly reflected. The brightness of illumination light is suppressed to the emission amount of light from the LED light source 80. On the other hand, the light is reflected within the chassis 14, and can reach the light source non-arrangement area DN-2. Because the light source non-overlapping portion DN-2 has a smaller light reflectance, more light is transmitted, and thereby brightness of predetermined illumination light can be obtained. Thus, an almost uniform brightness distribution can be obtained as the whole backlight unit 12. In the present embodiment, the light source overlapping portion DA-2 of the diffuser 450a has a low light reflectance area LR having a light reflectance smaller than that of the surrounding area in the light source overlapping portion DA-2. Because the light from the LED light source 80 is hardly reflected in the low light reflectance area LR, the improvement in brightness of the intended area can be realized by arranging the low light reflectance area LR in the predetermined area.

The longer service life and lower power consumption and the like can be achieved by using the LED light sources 80 arranged parallel to each other as the light source as in the present embodiment.

<Modification of Third Embodiment>

Figure 21:
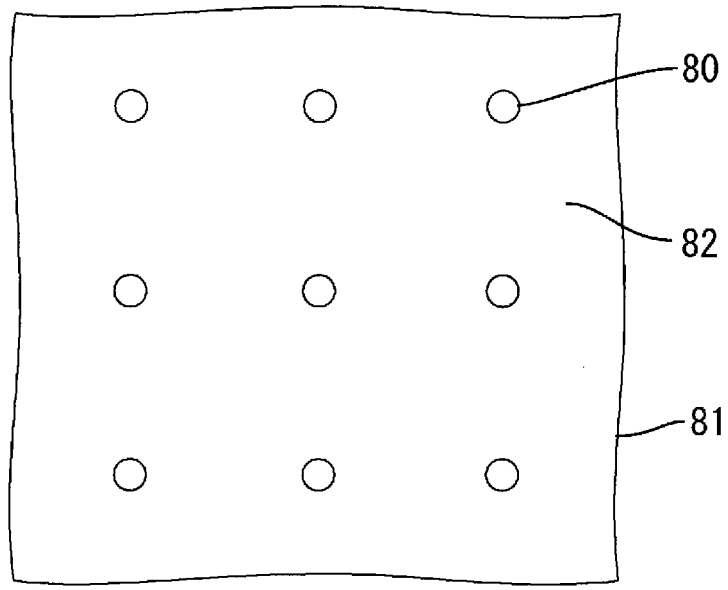
FIG. 21 is a schematic view illustrating a modification of an arranging aspect of LED light sources.
Figure 22:
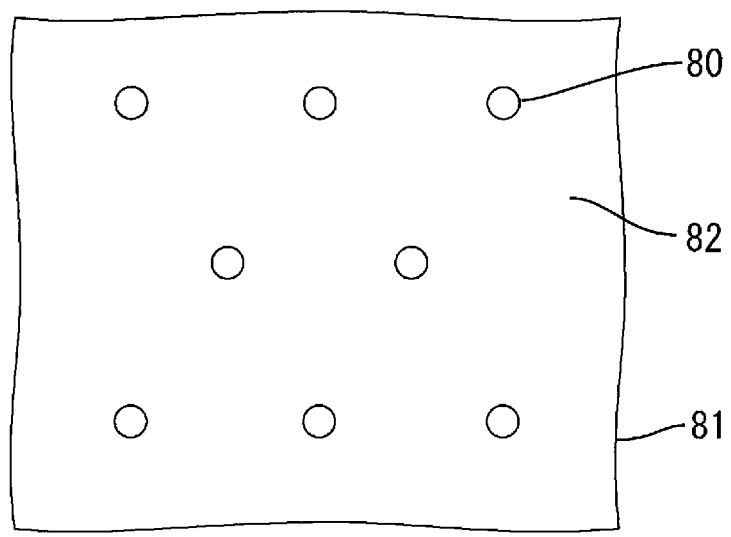
FIG. 22 is a schematic view illustrating another modification of an arranging aspect of LED light sources.

As the arranging aspect of the LED light sources 80 on the LED board 81 in the third embodiment, an aspect as illustrated in FIG. 21 or 22 can be also employed. That is, in the third embodiment, the LED light sources 80 are arranged in a hexagonal closest form, that is, such that all distances between the LED light sources 80 that are adjacent to each other are equivalent. However, as illustrated in FIG. 21, the LED light sources 80 may be aligned and arranged in the reticular pattern in the longitudinal and lateral directions. Alternatively, as illustrated in FIG. 22, the LED light sources 80 may be arranged with the positions of the adjacent LED light sources 80 alternately shifted while the LED light sources 80 are aligned in the longitudinal and lateral directions.

Other Embodiment

As describe above, the embodiments of the present invention have been described. However, the present invention is not limited to the above embodiments described in the above description and the drawings. The following embodiments are also included in the technical scope of the present invention, for example.

(1) The configuration in which one hot cathode tube is arranged has been exemplified in the above first embodiment. However, a configuration in which a plurality of hot cathode tubes is arranged is also included in the present invention.

(2) The configuration in which six cold cathode tubes are arranged has been exemplified in the above second embodiment. However, the number of the cold cathode tubes can be changed to a suitable number such as 4 or 8.

(3) The case where the hot cathode tube or the cold cathode tube which is a kind of a fluorescence tube (linear light source) is used as the light source has been illustrated in the above first and second embodiments. However, a case where other kinds of fluorescence tubes are used is also contained in the present invention. A case where discharge tubes (a mercury lamp and the like) other than the fluorescence tube are used is also contained in the present invention.

(4) The above third embodiment using the LED which is a kind of point light source as the light source have been illustrated. However, other kind of point light source is also used in the present invention. Other than that, a planar light source such as an organic EL can also be used.

(5) Each dot of the dot pattern constituting the light reflection portion has been formed into a round shape in the above embodiments. However, the shape of each dot is not limited thereto. Optional shapes such as a polygonal shape, for example, a rectangular shape can be selected.

(6) In the above embodiment, the optical sheet set obtained by combining the diffuser with the diffuser sheet, the lens sheet, and the reflecting type polarizing plate is exemplified.

However, for example, an optical sheet obtained by laminating two diffusers can also be employed.

(7) The light reflection portions are formed on the surface of the diffuser facing the light source in the above embodiments. However, the light reflection portions may be formed on the surface of the diffuser opposite to the light source.

(8) The configuration in which the light source arrangement area is formed in the center area of the bottom plate of the chassis has been illustrated in the above embodiments. However, the configuration can be suitably changed according to the amount of light of the light source and the operating condition of the backlight unit and the like. For example, the portions of forming the light source arrangement area can be suitably designed and changed such that the light source arrangement area is formed in the end area or in the center area and one end area of the bottom plate.

(9) The low light reflectance area has been formed into the elliptical shape in above embodiments. However, the shape of the low light reflectance area is not limited thereto. The low light reflectance area can be formed into an optional shape such as a polygonal shape, for example, a rectangular shape.

(10) In the above embodiments, the light reflection portion has been formed over the almost entire diffuser, and the low light reflectance area having a light reflectance smaller that of the surrounding area has been formed in accordance with the existence or nonexistence of the light reflection portion or the change in the area thereof. However, it is not necessary to form the light reflection portion on the diffuser. For example, the diffuser having areas having different light reflectance may be formed by changing a distribution aspect of light scattering particles dispersed and blended in the diffuser in every area. Furthermore, the area which does not contain the light scattering particles may be the low light reflectance area.

The invention claimed is:

1. A lighting device comprising:
a light source;
a chassis housing the light source and having an opening through which light exits; and
an optical member facing the light source and provided to cover the opening, wherein:
the chassis includes a light source arrangement area where the light source is arranged and a light source non-arrangement area where no light source is arranged;
the optical member has a light source overlapping portion overlapping with the light source arrangement area and a light source non-overlapping portion overlapping with the light source non-arrangement area;
the light source overlapping portion has a surface facing the light source, the surface having a light reflectance greater than that of the light source non-overlapping portion;
the light source overlapping portion includes a low light reflectance area on a surface facing the light source, the low light reflectance area having a light reflectance smaller than that of a surrounding area in the light source overlapping portion;
the light source has an elongated shape; and
the low light reflectance area is formed in an elongated shape extending along a longitudinal direction of the light source.

2. The lighting device according to claim 1, wherein the low light reflectance area is formed in an area including a center of the optical member.

3. The lighting device according to claim 1, wherein:
the low light reflectance area has an elliptical shape such that a long axis thereof matches the longitudinal direction of the light source.

4. A lighting device, comprising:
a light source;
a chassis housing the light source and having an opening through which light exits; and
an optical member facing the light source and provided to cover the opening, wherein:
the chassis includes a light source arrangement area where the light source is arranged and a light source non-arrangement area where no light source is arranged;
the optical member has a light source overlapping portion overlapping with the light source arrangement area and a light source non-overlapping portion overlapping with the light source non-arrangement area;
the light source overlapping portion has a surface facing the light source, the surface having a light reflectance greater than that of the light source non-overlapping portion;
the light source overlapping portion includes a low light reflectance area on a surface facing the light source, the low light reflectance area having a light reflectance smaller than that of a surrounding area in the light source overlapping portion;
the optical member has a light reflection portion reflecting light from the light source on at least a surface of the light source overlapping portion facing the light source;
the light reflection portion includes a dot pattern having light reflectivity; and
the light reflection portion is formed such that the light reflectance of the surface of the optical member facing the light source is continuously and gradually decreased toward a direction away from the light source.

5. The lighting device according to claim 4, wherein the optical member includes the light reflection portion formed in an area except the low light reflectance area.

6. A lighting device, comprising:
a light source;
a chassis housing the light source and having an opening through which light exits; and
an optical member facing the light source and provided to cover the opening, wherein:
the chassis includes a light source arrangement area where the light source is arranged and a light source non-arrangement area where no light source is arranged;
the optical member has a light source overlapping portion overlapping with the light source arrangement area and a light source non-overlapping portion overlapping with the light source non-arrangement area;
the light source overlapping portion has a surface facing the light source, the surface having a light reflectance greater than that of the light source non-overlapping portion;
the light source overlapping portion includes a low light reflectance area on a surface facing the light source, the low light reflectance area having a light reflectance smaller than that of a surrounding area in the light source overlapping portion;
the optical member has a light reflection portion reflecting light from the light source on at least a surface of the light source overlapping portion facing the light source;
the light reflection portion includes a dot pattern having light reflectivity; and
the light reflection portion is formed such that the light reflectance of the surface of the optical member facing the light source is decreased in a stepwise and sequential manner toward a direction away from the light source.

7. The lighting device according to claim 1, wherein the light source arrangement area has an area smaller than an area of the light source non-arrangement area in the chassis.

8. The lighting device according to claim 1, wherein:
the chassis has a portion facing the optical member;
the portion divided into at least a first end area, a second end area located at an end on an opposite side of the first end area, and a center area sandwiched between the first end area and the second end area; and
the center area is the light source arrangement area, and the first end area and the second end area are the light source non-arrangement areas.

9. The lighting device according to claim 1, wherein the optical member is a light diffusion member diffusing light from the light sources.

10. The lighting device according to claim 1, wherein the light source is a hot cathode tube.

11. The lighting device according to claim 1, wherein the light source is a cold cathode tube.

12. The lighting device according to claim 1, wherein the light source includes a plurality of LEDs arranged parallel to each other.

13. The display device comprising:
the lighting device according to claim 1; and
a display panel configured to provide display using light from the lighting device.

14. The display device according to claim 13, wherein the display panel is a liquid crystal panel using liquid crystals.

15. A television receiver comprising the display device according to claim 13.

* * * * *